US009813386B2

United States Patent
Fujii et al.

(10) Patent No.: US 9,813,386 B2
(45) Date of Patent: Nov. 7, 2017

(54) COOPERATION SERVICE PROVIDING SYSTEM AND SERVER APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Yoshihiro Fujii, Tokyo (JP); Koji Okada, Tokyo (JP); Hiroyuki Mayuzumi, Yashio (JP); Masahisa Tajiri, Fukuoka (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 308 days.

(21) Appl. No.: 14/668,347

(22) Filed: Mar. 25, 2015

(65) Prior Publication Data
US 2015/0200917 A1    Jul. 16, 2015

Related U.S. Application Data

(63) Continuation of application No. PCT/JP2013/069179, filed on Jul. 12, 2013.

(30) Foreign Application Priority Data

Sep. 25, 2012 (JP) .................................. 2012-211517

(51) Int. Cl.
H01L 29/06 (2006.01)
H04L 29/06 (2006.01)
(Continued)

(52) U.S. Cl.
CPC ........ *H04L 63/0428* (2013.01); *G06F 21/602* (2013.01); *G06F 21/62* (2013.01);
(Continued)

(58) Field of Classification Search
None
See application file for complete search history.

(56) References Cited

U.S. PATENT DOCUMENTS 6,141,753 A * 10/2000 Zhao ..................... G06T 1/0021
380/277
7,099,477 B2 * 8/2006 Bade ...................... G06F 21/57
380/279
(Continued)

FOREIGN PATENT DOCUMENTS

CN    101542968 A    9/2009
CN    102461061 A    5/2012
(Continued)

OTHER PUBLICATIONS

Singaporean Search Report dated Aug. 19, 2015 in Patent Application No. 11201502283W.
(Continued)

*Primary Examiner* — Maung Lwin
(74) *Attorney, Agent, or Firm* — Oblon, McClelland, Maier & Neustadt, L.L.P.

(57) ABSTRACT

Upon receiving ciphertext data transmitted by each service apparatus, a cooperation apparatus according to an embodiment generates re encrypted data by performing re encryption processing for the ciphertext data using are encryption key. Each of the service apparatuses transmits, to the cooperation apparatus, a request to acquire user information of a user specified by an identification (ID) indicated by the ciphertext data and stored in the other service apparatus, together with the ciphertext data. Upon receiving the re encrypted data transmitted by the cooperation apparatus, the service apparatus acquires an ID by decrypting the re encrypted data using a private key, reads out user information, and transmits the user information to the other service apparatus.

5 Claims, 11 Drawing Sheets

(51) Int. Cl.
  G06F 21/62    (2013.01)
  G09C 1/00     (2006.01)
  H04L 9/08     (2006.01)
  G06F 21/60    (2013.01)

(52) U.S. Cl.
  CPC .............. *G09C 1/00* (2013.01); *H04L 9/0847* (2013.01); *H04L 63/061* (2013.01); *G06F 2221/2107* (2013.01); *H04L 63/0471* (2013.01); *H04L 2209/76* (2013.01)

(56) References Cited

U.S. PATENT DOCUMENTS

| | | | | |
|---|---|---|---|---|
| 7,178,038 | B2* | 2/2007 | Kamperman | G11B 20/00086 380/277 |
| 7,236,956 | B1* | 6/2007 | Ogg | G06F 21/602 400/401 |
| 7,661,132 | B2* | 2/2010 | Ohkubo | G06F 21/606 713/179 |
| 8,233,627 | B2* | 7/2012 | Tanaka | G06Q 20/3829 348/E7.01 |
| 8,347,093 | B1* | 1/2013 | Ahmed | G06F 21/31 713/168 |
| 8,954,740 | B1* | 2/2015 | Moscaritolo | H04L 63/065 380/277 |
| 2005/0157872 | A1* | 7/2005 | Ono | H04L 9/302 380/28 |
| 2006/0080732 | A1* | 4/2006 | Ohkubo | G06F 21/606 726/9 |
| 2006/0088167 | A1* | 4/2006 | Bade | G06F 21/57 380/281 |
| 2007/0192140 | A1* | 8/2007 | Gropper | G06Q 50/24 705/3 |
| 2008/0059787 | A1 | 3/2008 | Hohenberger et al. | |
| 2008/0170701 | A1* | 7/2008 | Matsuo | H04L 63/0442 380/281 |
| 2012/0096266 | A1 | 4/2012 | Fukuda | |
| 2013/0103946 | A1* | 4/2013 | Binenstock | H04L 63/0492 713/168 |
| 2013/0212388 | A1* | 8/2013 | D'Souza | H04L 9/0825 713/168 |

FOREIGN PATENT DOCUMENTS

| | | |
|---|---|---|
| JP | 2004-220527 A | 8/2004 |
| JP | 2006-195791 A | 7/2006 |
| WO | WO 2010/150817 A1 | 12/2010 |
| WO | WO 2012/111713 A1 | 8/2012 |

OTHER PUBLICATIONS

Piotr K. Tysowski, et al., "Re-Encryption-Based Key Management Towards Secure and Scalable Mobile Applications in Clouds" Cryptology ePrint Archive: Report 2011/668, Dec. 9, 2011, 10 Pages.

Matthew Green, et al., "Identity-Based Proxy Re-Encryption" Cryptology ePrint Archive: Report 2006/473, Dec. 15, 2006, 21 Pages.

Combined Chinese Office Action and Search Report dated Feb. 28, 2017 in Chinese Patent Application No. 201380049570.3 (with English translation of categories of cited documents).

International Search Report dated Sep. 3, 2013 for PCT/JP2013/069179 filed on Jul. 12, 2013 with English Translation.

Written Opinion dated Sep. 3, 2013 for PCT/JP2013/069179 filed on Jul. 12, 2013.

Blaze, M., et al., "Atomic Proxy Cryptography," *AT&T Labs Research*, TR98.5.1, 1997 pp. 1-11.

Blaze, M., et al., "Divertable Protocols and Atomic Proxy Cryptography," EUROCRYPT 98: *Lecture Notes in Computer Science*, vol. 1403, 1998, pp. 127-144.

Ateniese, G. et al., "Improved Proxy Re-Encryption Schemes with Applications Secure Distributed Storage," *ACM Transations on Information and System Security*, vol. 9, No. 1, 2006, pp. 1-25.

Libert, B., et al., "Tracing Malicious Proxies in Proxy Re-Encryption," *Lecture Notes in Computer Science*, vol. 5209, 2008, 22pgs.

Canetti, R., et al., "Chosen Ciphertext Secure Proxy Re-Encryption," *ACM CCS*, 2007, pp. 1-22.

Green, M., et al, "Identity-Based Proxy Re-Encryption," *ACNS '07 Proceedings of the 5th International conference on Applied Cryptography and Network Security*, 2007, pp. 1-22.

Matsuo, T., "Proxy Re-encryption Systems for Identity-based Encryption," *Lecture Notes in Computer Science*, vol. 4575, 2007, pp. 1-21.

Libert, B., et al., "Unidirectional Chosen-Ciphertext Secure Proxy Re-Encryption," *Lecture Notes in Computer Science*, vol. 4939, 2008, pp. 1-27.

Ateniese, G., et al., "Proxy Re-Signatures: New Definitions, Algorithms, and Applications," *CCS '05: Proceedings of the 12th ACM conference on Computer and Communications Security*, 2005, pp. 1-23.

Menezes, A.J., et al., "Digital Signatures," *Handbook of Applied Cryptography*, Chapter 11, CRC Press, 1997, pp. 462-471.

Kubota, F., et al., "Gentry IBE ni Motozuku IBE-IBE Proxy Re-Encryption," *Symposium on Cryptography and Information Security*, 2011, pp. 1-8.

Yoshida, T., et al., "Proxy Re-encryption Scheme for Secure Data Sharing in Cloud Services," *Toshiba Review*, vol. 66, No. 11, 2011, pp. 18-22 with English Abstract.

* cited by examiner

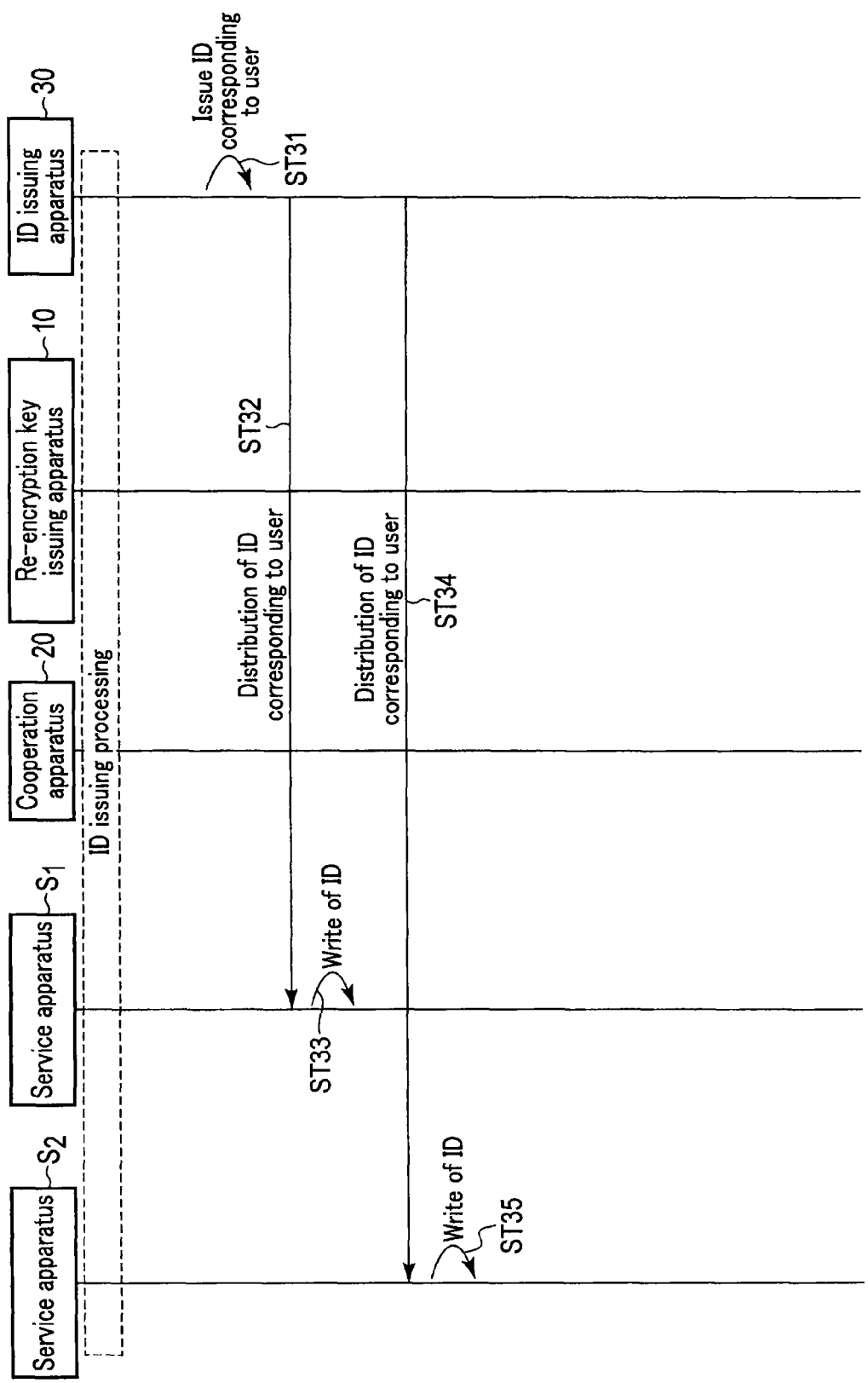
F I G. 3

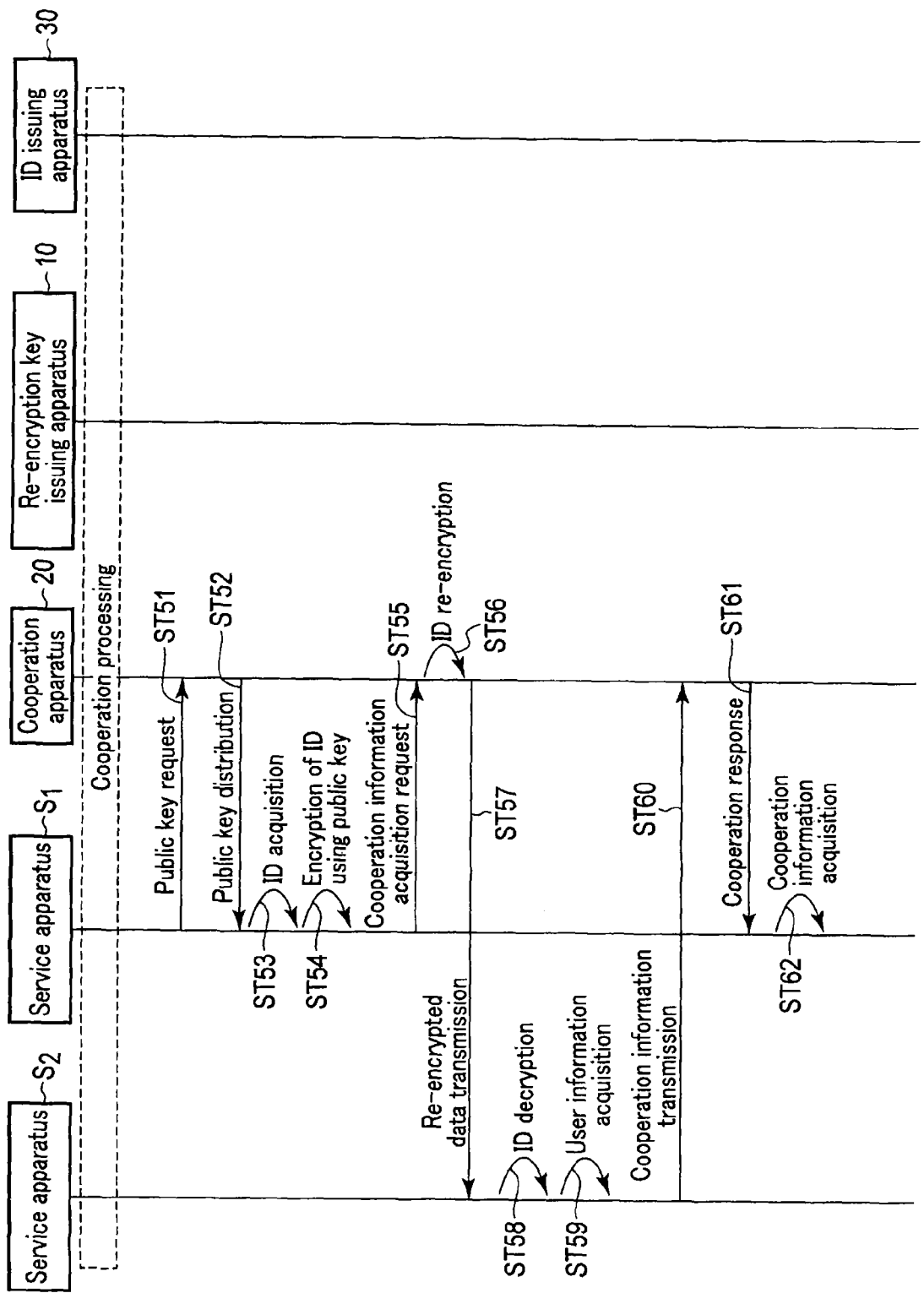
F I G. 5

COOPERATION SERVICE PROVIDING SYSTEM AND SERVER APPARATUS

CROSS-REFERENCE TO RELATED APPLICATIONS

This application is a Continuation Application of PCT application No. PCT/JP2013/069179, filed on Jul. 12, 2013, and is based upon and claims the benefit of priority from Japanese Patent Application No. 2012-211517, filed on Sep. 25, 2012; the entire contents of which are incorporated herein by reference.

FIELD

Embodiments described herein relate generally to a cooperation service providing system and a server apparatus.

BACKGROUND

As a cooperation service providing scheme in which a plurality of apparatuses mutually transmit/receive information to provide one service, there are provided a scheme of directly connecting each apparatus to another apparatus and a scheme of connecting respective apparatuses via a common bus having an identification (ID) conversion function, a log function, and the like. Among these two schemes, in the former scheme of directly connecting each apparatus to another apparatus, it is difficult to verify/audit transmitted/received contents later since there is no point where pieces of information (to be referred to as cooperation information hereinafter) mutually transmitted/received between apparatuses are integrated and managed. Consequently, the latter scheme of connecting respective apparatuses via a common bus having an ID conversion function, a log function, and the like is desired.

Even if IDs for identifying pieces of information held in respective apparatuses are ones for identifying the same information, the IDs themselves are generally different for the respective apparatuses. The ID conversion function is a function of certifying that IDs are ones for identifying the same information even if the IDs themselves are different for respective apparatuses. Note that examples of a scheme for implementing the ID conversion function are a table reference scheme and a function scheme.

For example, as a cooperation service providing technique to which the table reference scheme is applied, there is provided a cooperation service providing technique of implementing cooperation of IDs (that is, transmission/reception of cooperation information) between a plurality of apparatuses by storing a table in advance in a cooperation apparatus which causes the plurality of apparatuses to cooperate with each other, and referring to the table when causing the respective apparatuses to cooperate with each other.

Furthermore, as a cooperation service providing technique to which the function scheme is applied, for example, there is provided a cooperation service providing technique of implementing cooperation of IDs (that is, transmission/reception of cooperation information) between a plurality of apparatuses by decrypting, on a cooperation apparatus, information containing an ID transmitted from one of respective apparatuses to cooperate with each other by using secret information in AES, and then re-converting the information into a code for the other apparatus to transmit it.

In addition, as a cooperation service providing technique to which the function scheme is applied, there is provided a cooperation service providing technique of implementing transmission/reception of cooperation information between respective apparatuses by using a public key cryptosystem for the cooperation information.

As for the public key cryptosystem, a technique called proxy re-encryption will now be described.

A basic model of this technique is formed from five functions (to also be referred to as algorithms hereinafter) of key generation, encryption, decryption, re-encryption key generation, and re-encryption. The key generation function, encryption function, and decryption function are the same as those of the normal public key cryptosystem.

(Key Generation) KeyGen($1^k$)→(pk, sk)

Upon input of a security parameter $1^k$, a key generation algorithm KeyGen outputs a set (pk, sk) of a public key pk and a private key sk.

(Encryption) Enc($pk_A$, m)→$C_A$

Upon input of a public key $pk_A$ of a user A and a message m, an encryption algorithm Enc outputs ciphertext $C_A$ destined for the user A.

(Decryption) Dec($sk_A$, $C_A$)→m

Upon input of a private key $sk_A$ of the user A and the ciphertext $C_A$ destined for the user A, a decryption algorithm Dec outputs the message m.

(Re-Encryption Key Generation) ReKeyGen($pk_A$, $sk_A$, $pk_B$, $sk_B$)→$rk_{A \to B}$ Upon input of the public key $pk_A$ and private key $sk_A$ of the user A and a public key $pk_B$ and private key $sk_B$ of a user B, a re-encryption key generation algorithm ReKeyGen outputs a re-encryption key $rk_{A \to B}$.

(Re-Encryption) ReEnc($rk_{A \to B}$, $C_A$)→$C_B$

Upon input of the re-encryption key $rk_{A \to B}$ and the ciphertext $C_A$ destined for the user A, a re-encryption algorithm ReEnc outputs ciphertext $C_B$ destined for the user B.

The basic model has been explained. In accordance with a scheme of implementing re-encryption, however, a model in which inputs to functions are different and a model which includes functions and keys in addition to the above-described functions and keys are also considered.

For example, as for the input of the re-encryption key generation algorithm, a model called a non-interactive model which eliminates the need for the private key $sk_B$ of the user B, and a model in which the re-encryption key $rk_{A \to B}$ destined for the user B and a private key $sk_C$ of a user C are input instead of the private key $sk_A$ of the user A are considered.

In addition, there are known a model called a unidirectional model in which re-encryption of cyphertext $C_A \to C_B$ can be performed using the re-encryption key $rk_{A \to B}$ while inverse conversion of cyphertext $C_B \to C_A$ cannot be performed, and a model called a bidirectional model in which inverse conversion can also be performed. Note that in the bidirectional mode, the re-encryption key $rk_{A \to B}$ may also be represented by $rk_{A \leftrightarrow B}$.

Furthermore, among public key cryptosystems, an ID-based encryption scheme is considered. In this case, the number of function setup operations for master key generation increases, a master key and ID are additionally input to the key generation algorithm KeyGen. In ID-based encryption, the public key pk serves as an ID.

As practical examples of the schemes, there are known schemes described in G. Ateniese, K. Fu, M. Green, S. Hohenberger. Improved Proxy Re-Encryption Schemes with Applications to Secure Distributed Storage. In NDSS'05, 2005, and B. Libert, D. Vergnaud. Tracing Malicious Proxies in Proxy Re-Encryption. In Pairing 2008, 2008, for the unidirectional model, a scheme described in R. Canetti, S. Hohenberger. Chosen-Ciphertext Secure Proxy Re-Encryption. In ACM CCS'07, 2007, for the bidirectional model, and schemes described in M. Green, G. Ateniese. Identity-Based Proxy Re-encryption. In ACN'07, 2007, and T. Matsuo. Proxy Re-encryption Systems for Identity-based Encryption. In Pairing 2007, 2007, the like for ID-based encryption. Note that embodiments refer to a scheme described in Benoit Libert, Damien Vergnaud, "Unidirectional Chosen-Ciphertext Secure Proxy Re-encryption", Public Key Cryptography 2008, pp. 360-279.

In the above cooperation service providing techniques, however, pieces of cooperation information (that is, IDs) can be linked with each other on the cooperation apparatus, and a process of exchanging cooperation information between respective apparatuses cannot be audited/verified later on the cooperation apparatus.

Problems to be solved by the present invention are to prevent pieces of cooperation information from being linked with each other on a cooperation apparatus, and provide a cooperation service providing system which allows auditing/verification to be performed later on the cooperation apparatus, and a server apparatus.

BRIEF DESCRIPTION OF THE DRAWINGS

FIG. 3 is a sequence chart showing an example of ID issuing processing according to the first embodiment.

FIG. 5 is a sequence chart showing an example of cooperation processing according to the first embodiment.

DETAILED DESCRIPTION

In general, according to one embodiment, in a cooperation service providing system, a re-encryption key issuing apparatus, a plurality of service apparatuses for providing various services to a user by using an ID issued for identifying the user, and a cooperation apparatus for causing the plurality of service apparatuses to cooperate with each other are communicably connected to each other.

The cooperation apparatus comprises a first storage device, a second storage device, a first generation device, a first transmission device, and a second transmission device.

The first storage device stores public keys of the re-encryption key issuing apparatus and the service apparatuses.

The second storage device stores a re-encryption key for implementing re-encryption processing of enabling cyphertext data transmitted by each of the service apparatuses to be decrypted using a private key of the other service apparatus without decrypting the cyphertext data into plaintext data.

Upon receiving the ciphertext data transmitted by each of the service apparatuses, the first generation device generates re-encrypted data by performing re-encryption processing for the ciphertext data using the stored re-encryption key.

The first transmission device transmits the generated re-encrypted data to the other service apparatus different from the service apparatus which has transmitted the ciphertext data.

The second transmission device transmits the stored public key to each of the service apparatuses.

Each of the service apparatuses comprises a third storage device, a fourth storage device, a second generation device, a third transmission device, an acquisition device, a readout device, and a fourth transmission device.

The third storage device stores the issued ID in association with user information indicating information of the user unique to the service apparatus.

The fourth storage device stores a private key of the service apparatus.

In response to an operation of the user, the second generation device generates ciphertext data by performing encryption processing for the ID of the user using the public key of the encryption key issuing apparatus transmitted by the cooperation apparatus.

The third transmission device transmits, to the cooperation apparatus, a request to acquire user information of a user specified by the ID indicated by the ciphertext data and stored in the other service apparatus, together with the generated ciphertext data.

Upon receiving the re-encrypted data transmitted by the cooperation apparatus, the acquisition device acquires the encrypted ID by decrypting the re-encrypted data using the stored private key.

The readout device reads out the user information corresponding to the acquired ID from the third storage device.

The fourth transmission device transmits the readout user information to the other service apparatus via the cooperation apparatus.

First Embodiment

Figure 1:
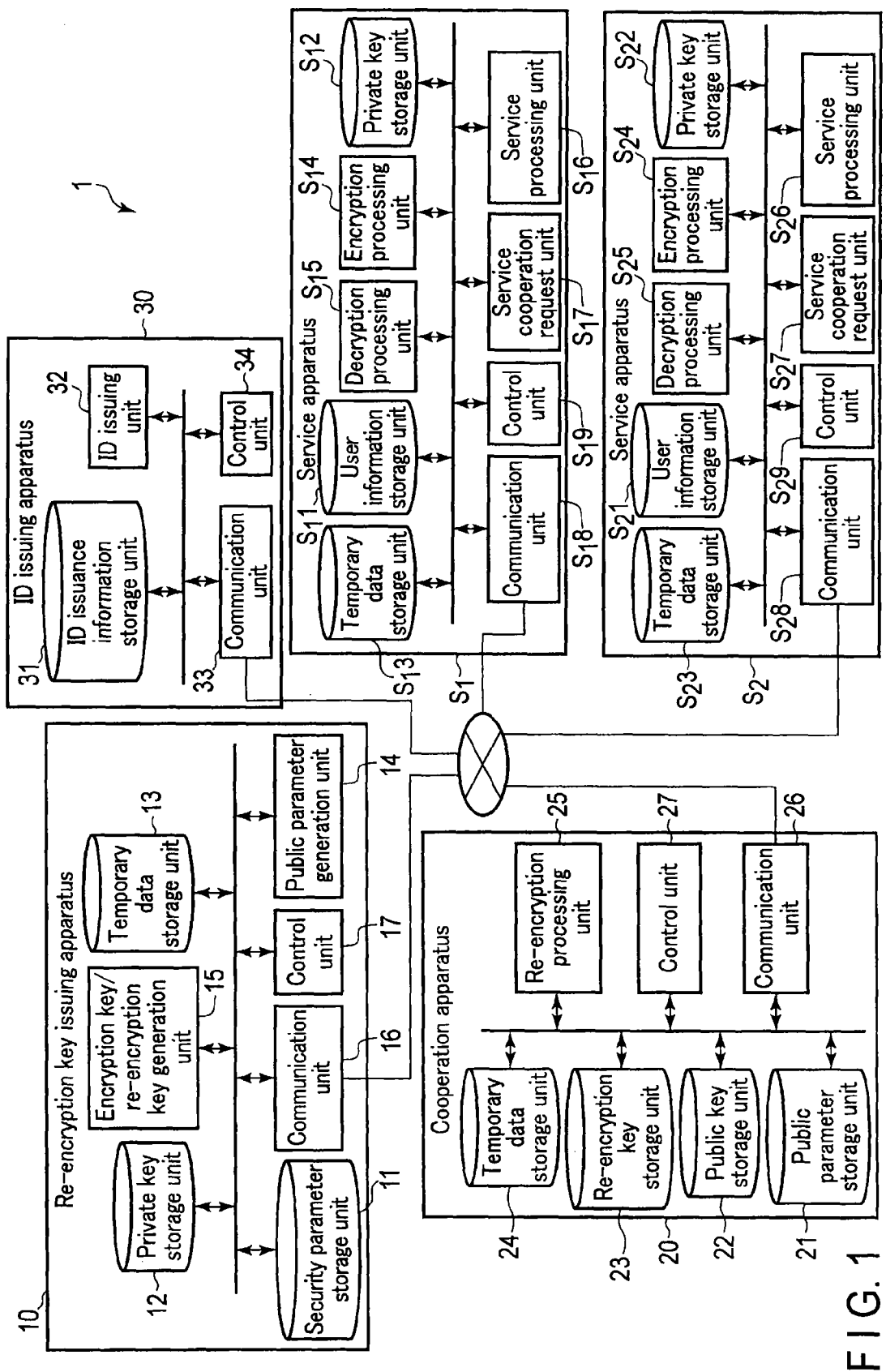
FIG. 1 is a schematic view showing an example of the arrangement of a cooperation service providing system according to the first embodiment.

FIG. 1 is a schematic view showing an example of the arrangement of a cooperation service providing system according to the first embodiment. As shown in FIG. 1, a cooperation service providing system 1 includes a re-encryption key issuing apparatus 10, a cooperation apparatus (to also be referred to as a server apparatus hereinafter) 20, an ID issuing apparatus 30, and a plurality of service apparatuses $S_1$ and $S_2$.

Note that the number of service apparatuses is two in this embodiment for the sake of simplicity but is not limited to this. The ID issuing apparatus 30 issues an ID for identifying a user who uses each of the service apparatuses $S_1$ and $S_2$, and distributes the ID to the respective service apparatus. This arrangement of the ID issuing apparatus 30, however, is not essential since it is only necessary to store information (to be referred to as "user information" hereinafter) of the user who uses each of the service apparatuses $S_1$ and $S_2$ in association with the ID. Any ID distribution method may be used (an external apparatus which is not included in the arrangement according to this embodiment may distribute an ID).

The arrangements of the apparatuses 10 to 30, $S_1$, and $S_2$ will be described in detail below.

The re-encryption key issuing apparatus 10 includes a security parameter storage unit 11, a private key storage unit 12, a temporary data storage unit 13, a public parameter generation unit 14, an encryption key/re-encryption key generation unit 15, a communication unit 16, and a control unit 17.

The security parameter storage unit 11 is a storage device which stores a security parameter necessary for generating public parameters for key generation. The security parameter is, for example, a threshold defining a condition under which public parameters are generated.

The private key storage unit 12 is a storage device which stores a private key of a key pair (public key/private key) of the re-encryption key issuing apparatus 10, which has been generated by the encryption key/re-encryption key generation unit 15 using the public parameters.

The temporary data storage unit 13 is a storage device which stores the public key of the self apparatus 10 generated by the encryption key/re-encryption key generation unit 15, and temporary data such as the intermediate processing data and processing results of the public parameter generation unit 14 and encryption key/re-encryption key generation unit 15.

The public parameter generation unit 14 has a function of generating public parameters for key generation by using the security parameter read out from the security parameter storage unit 11, and a function of writing the intermediate processing data and processing result of processing of generating public parameters in the temporary data storage unit 13.

The encryption key/re-encryption key generation unit 15 has a function of generating a key pair of the self apparatus 10 by using the public parameters generated by the public parameter generation unit 14, and a function of writing the private key of the generated key pair in the private key storage unit 12 and writing the public key of the generated key pair in the temporary data storage unit 13. The encryption key/re-encryption key generation unit 15 also has a function of generating a re-encryption key using the private key of the re-encryption key issuing apparatus 10 read out from the private key storage unit 12 and the public keys of the service apparatuses $S_1$ and $S_2$ transmitted by the cooperation apparatus 20 (to be described later), and a function of writing the intermediate processing data and processing result of processing of generating a re-encryption key in the temporary data storage unit 13.

The communication unit 16 allows the self apparatus to communicate with the other apparatuses 20, 30, $S_1$, and $S_2$. For example, the communication unit 16 has a function of transmitting, to the cooperation apparatus 20, the public parameters generated by the public parameter generation unit 14, and the public key of the self apparatus 10 and the re-encryption key which have been generated by the encryption key/re-encryption key generation unit 15. The communication unit 16 also has a function of transmitting various requests from the re-encryption key issuing apparatus 10 to the cooperation apparatus 20.

The control unit 17 has a function of controlling the respective units 11 to 16.

The cooperation apparatus 20 includes a public parameter storage unit 21, a public key storage unit 22, a re-encryption key storage unit 23, a temporary data storage unit 24, a re-encryption processing unit 25, a communication unit 26, and a control unit 27.

The public parameter storage unit 21 is a storage device which stores the public parameters transmitted by the re-encryption key issuing apparatus 10.

The public key storage unit 22 is a storage device which stores the public keys transmitted by the re-encryption key issuing apparatus 10 and the service apparatuses $S_1$ and $S_2$.

The re-encryption key storage unit 23 is a storage device which stores the re-encryption key transmitted by the re-encryption key issuing apparatus 10.

The temporary data storage unit 24 is a storage device which stores temporary data such as the intermediate processing data and processing result of the re-encryption processing unit 25.

The re-encryption processing unit 25 has a function of re-encrypting ciphertext data transmitted by each of the service apparatuses $S_1$ and $S_2$ using the re-encryption key read out from the re-encryption key storage unit 23, and a function of writing the intermediate processing data and processing result of re-encryption processing in the temporary data storage unit 24. More specifically, the re-encryption processing unit 25 has a function of re-encrypting ciphertext data transmitted from one service apparatus (for example, the service apparatus $S_1$) into one for the other service apparatus (for example, the service apparatus $S_2$) (that is, generating re-encrypted data) by using the re-encryption key read out from the re-encryption key storage unit 23 without decrypting the ciphertext data into plaintext data.

The communication unit 26 allows the self apparatus to communicate with the other apparatuses 10, 30, $S_1$, and $S_2$. The communication unit 26 has, for example, a function of writing, in the respective corresponding storage units 21 to 23, the public parameters transmitted by the re-encryption key issuing apparatus 10, the public keys transmitted by the re-encryption key issuing apparatus 10 and the service apparatuses $S_1$ and $S_2$, and the re-encryption key transmitted by the re-encryption key issuing apparatus 10, and a function of transmitting the re-encrypted data re-encrypted by the re-encryption processing unit 25 to the respective service apparatuses $S_1$ and $S_2$. The communication unit 26 also has a function of transmitting the public parameters and public keys to the other apparatuses 10, 30, $S_1$, and $S_2$ in response to requests from the apparatuses 10, 30, $S_1$, and $S_2$, respectively.

The control unit 27 has a function of controlling the respective units 21 to 26.

The ID issuing apparatus 30 includes an ID issuance information storage unit 31, an ID issuing unit 32, a communication unit 33, and a control unit 34.

The ID issuance information storage unit 31 is a storage device which stores an ID issued by the ID issuing unit 32.

The ID issuing unit 32 has a function of issuing a unique ID for identifying a user who uses each of the service apparatuses $S_1$ and $S_2$, and a function of writing the issued ID in the ID issuance information storage unit 31.

The communication unit 33 allows the self apparatus to communicate with the other apparatuses 10, 20, $S_1$, and $S_2$, and has, for example, a function of distributing the ID issued by the ID issuing unit 32 to the respective service apparatuses $S_1$ and $S_2$.

The control unit 34 has a function of controlling the respective units 31 to 33.

The practical arrangement of each of the service apparatuses $S_1$ and $S_2$ will be described next. The arrangement of the service apparatus $S_1$ will be explained below as a representative example for the sake of simplicity.

The service apparatus $S_1$ includes a user information storage unit $S_1\mathbf{1}$, a private key storage unit $S_1\mathbf{2}$, a temporary data storage unit $S_1\mathbf{3}$, an encryption processing unit $S_1\mathbf{4}$, a decryption processing unit $S_1\mathbf{5}$, a service processing unit $S_1\mathbf{6}$, a service cooperation request unit $S_1\mathbf{7}$, a communication unit $S_1\mathbf{8}$, and a control unit $S_1\mathbf{9}$.

The user information storage unit $S_1\mathbf{1}$ is a storage device which stores the ID distributed by the ID issuing apparatus 30 in association with the information (user information) of the user who uses the service apparatus $S_1$.

The private key storage unit $S_1\mathbf{2}$ is a storage device which stores the private key of a key pair of the self apparatus $S_1$ generated by the encryption processing unit $S_1\mathbf{4}$ using the public parameters.

The temporary data storage unit $S_1\mathbf{3}$ is a storage device which stores a public key of the self apparatus $S_1$ generated by the encryption processing unit $S_1\mathbf{4}$, and temporary data such as the intermediate processing data and processing results of the encryption processing unit $S_1\mathbf{4}$ and decryption processing unit $S_1\mathbf{5}$.

The encryption processing unit $S_1\mathbf{4}$ has a function of generating a key pair of the self apparatus $S_1$ using the public parameters transmitted by the cooperation apparatus 20, and a function of writing the private key of the generated key pair in the private key storage unit $S_1\mathbf{2}$ and writing the public key of the generated key pair in the temporary data storage unit $S_1\mathbf{3}$. The encryption processing unit $S_1\mathbf{4}$ also has a function of generating ciphertext data by performing encryption processing for plaintext data (for example, the ID stored in the user information storage unit $S_1\mathbf{1}$ or the like) using the public key of the re-encryption key issuing apparatus 10 transmitted by the cooperation apparatus 20, and a function of writing the intermediate processing data and processing result of processing of generating ciphertext data in the temporary data storage unit $S_1\mathbf{3}$.

The decryption processing unit $S_1\mathbf{5}$ has a function of decrypting the re-encrypted data transmitted by the cooperation apparatus 20 by using the private key read out from the private key storage unit $S_1\mathbf{2}$, and a function of writing the intermediate processing data and processing result of decryption processing in the temporary data storage unit $S_1\mathbf{3}$.

The service processing unit $S_1\mathbf{6}$ has a function of providing a service in response to a request from the user.

The service cooperation request unit $S_1\mathbf{7}$ has a function of requesting the cooperation apparatus 20 via the communication unit $S_1\mathbf{8}$ to acquire information held in the other service apparatus.

The communication unit $S_1\mathbf{8}$ allows the self apparatus to communicate with the other apparatuses 10 to 30 and $S_2$. The communication unit $S_1\mathbf{8}$ has, for example, a function of writing the ID distributed from the ID issuing apparatus 30 in the user information storage unit $S_1\mathbf{1}$ in association with the user information, and a function of transmitting the public key and ciphertext data generated by the encryption processing unit $S_1\mathbf{4}$ to the cooperation apparatus 20. The communication unit $S_1\mathbf{8}$ also has a function of transmitting various requests from the service apparatus $S_1$ to the cooperation apparatus 20.

The control unit $S_1\mathbf{9}$ has a function of controlling the respective units $S_1\mathbf{1}$ to $S_1\mathbf{8}$.

Note that each of the service apparatuses $S_1$ and $S_2$ provides a unique service to the user, and does not share user information with the other service apparatus.

An example of the operation of the cooperation service providing system 1 with the above arrangement will be described with reference to sequence charts shown in FIGS. 2, 3, 4, and 5.

The following operation is executed in an order of (1) preprocessing and (2) cooperation processing, and (1) preprocessing is executed in an order of (1-1) key generation processing, (1-2) ID issuing processing, and (1-3) re-encryption key generation processing. Note that the preprocessing need not always be executed in the above order. For example, the ID issuing processing may be executed before the key generation processing.

Figure 2:
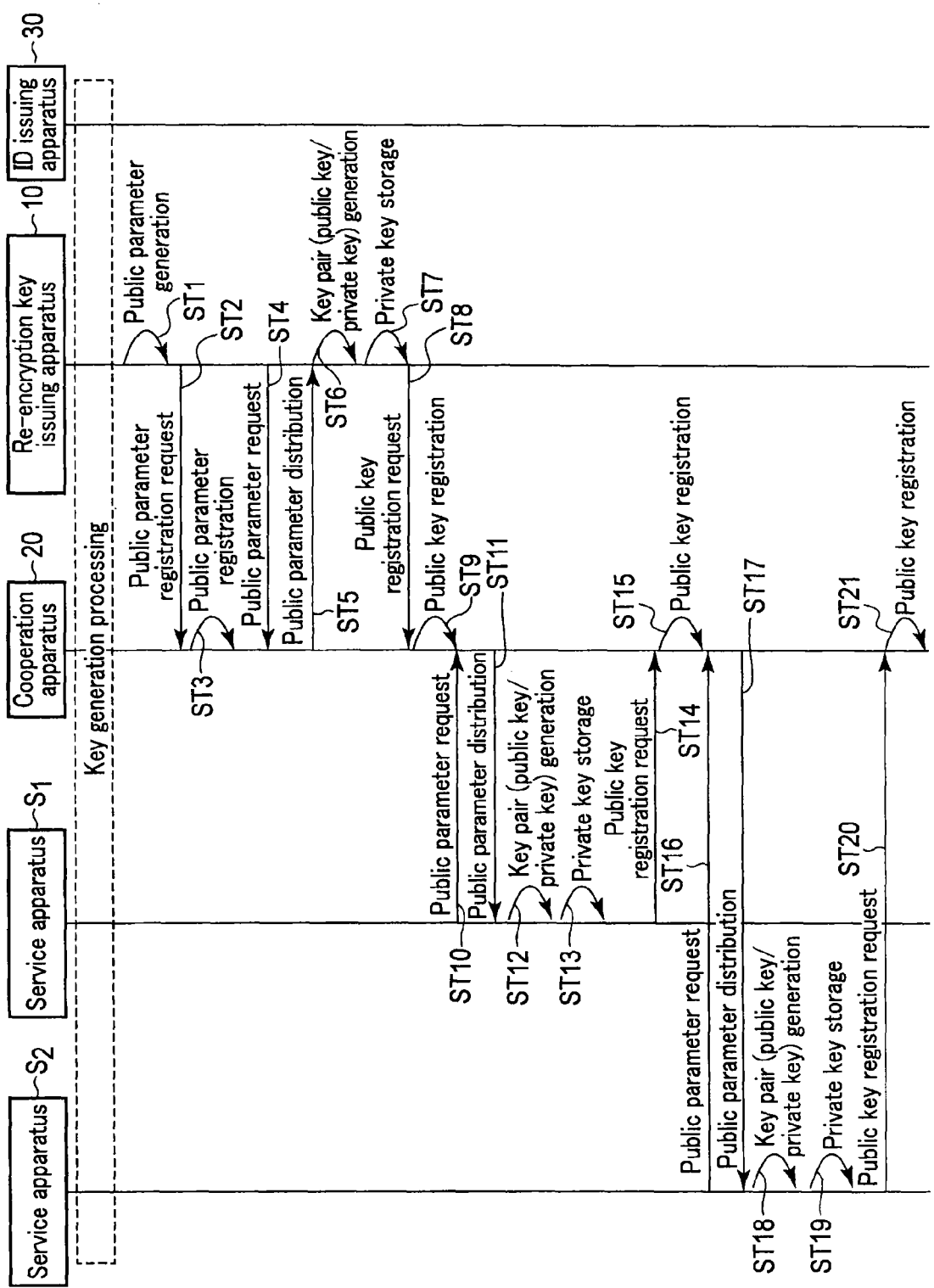
FIG. 2 is a sequence chart showing an example of key generation processing according to the first embodiment.

The re-encryption key issuing apparatus 10 and the respective service apparatuses $S_1$ and $S_2$ execute (1) key generation processing, as shown in FIG. 2 and indicated by steps ST1 to ST21 below.

First, the public parameter generation unit 14 of the re-encryption key issuing apparatus 10 generates public parameters (p, λ, G, $G_T$, g, u, v, and Sig) (step ST1). More specifically, based on a security parameter λ stored in advance in the security parameter storage unit 11, the public parameter generation unit 14 selects bilinear map groups (G and $G_T$) satisfying a prime number order p>2λ, and a one-time signature Sig ($\hat{G}$, $\hat{S}$, $\hat{V}$) with strong unforgeability which satisfies generation sources g, u, v ∈G.

In the one-time signature Sig ($\hat{G}$, $\hat{S}$, $\hat{V}$) (to be also referred to as "Sig" hereinafter), $\hat{G}$ represents a function of generating a one-time key pair (ssk, svk), $\hat{S}$ represents a function of generating a signature σ for a message ID, and $\hat{V}$ represents a function of verifying correctness of the signature σ.

A one-time signature is described in detail in A. Menezes, P. van Oorschot, S. Vanstone, "Handbook of Applied Cryptography", CRC Press, (1996). Furthermore, G and $G_T$ are group sets each defined by an elliptic curve, and used for a pairing function.

Paring function: $e(g_1, g_2) = g_T$ where $g_1, g_2 \in G$ and $g_T \in G_T$.

This paring function has characteristics given by:

$e(g^a, g) = e(g, g^a) = e(g, g)^a$ where g∈G and a∈$Z_p$

The communication unit 16 transmits the public parameters (p, λ, G, $G_T$, g, u, v, and Sig) generated by the public parameter generation unit 14 to the cooperation apparatus 20 (that is, the public parameters are made public to the other apparatuses 20, 30, $S_1$, and $S_2$) (step ST2).

Upon receiving the public parameters (p, λ, G, $G_T$, g, u, v, and Sig) transmitted by the re-encryption key issuing apparatus 10, the communication unit 26 of the cooperation apparatus 20 writes (registers) the public parameters in the public parameter storage unit 21 (step ST3).

The communication unit 16 of the re-encryption key issuing apparatus 10 requests the cooperation apparatus 20 to distribute the public parameters (step ST4).

Upon receiving the request from the re-encryption key issuing apparatus 10 in step ST4, the communication unit 26 of the cooperation apparatus 20 transmits the public parameters (p, λ, G, $G_T$, g, u, v, and Sig) stored in the public parameter storage unit 21 to the re-encryption key issuing apparatus 10 (step ST5).

Subsequently, upon receiving, via the communication unit 16, the public parameters (p, λ, G, $G_T$, g, u, v, and Sig) transmitted by the cooperation apparatus 20, the encryption key/re-encryption key generation unit 15 of the re-encryption key issuing apparatus 10 generates a key pair of the re-encryption key issuing apparatus 10 using the public parameters (step ST6). More specifically, when identification information of the re-encryption key issuing apparatus 10 is indicated by i, the encryption key/re-encryption key generation unit 15 generates a private key $x_i \epsilon Z_p^*$ of the re-encryption key issuing apparatus 10, and generates a public key $X_i = g^{x_i}$ of the re-encryption key issuing apparatus 10 using the private key $x_i$.

The encryption key/re-encryption key generation unit 15 writes the private key $x_i$ of the key pair of the self apparatus 10 generated in step ST6 in the private key storage unit 12, and writes the public key $X_i$ of the generated key pair of the self apparatus 10 in the temporary data storage unit 13 (step ST7).

The communication unit 16 transmits the public key $X_i$ stored in the temporary data storage unit 13 to the cooperation apparatus 20 (that is, the public key $X_i$ is made public to the other apparatuses 20, 30, $S_1$, and $S_2$) (step ST8).

After that, upon receiving the public key $X_i$ of the re-encryption key issuing apparatus 10 transmitted by the re-encryption key issuing apparatus 10, the communication unit 26 of the cooperation apparatus 20 writes (registers) the public key in the public key storage unit 22 (step ST9).

Similarly, the service apparatus $S_1$ executes processes similar to those in steps ST4 to ST9 for the key pair of the service apparatus $S_1$, writes a private key $x_j$ in the private key storage unit $S_1 2$ of the service apparatus $S_1$, and transmits a public key $X_j$ to the cooperation apparatus 20, thereby registering the public key $X_j$ of the service apparatus $S_1$ in the public key storage unit 22 of the cooperation apparatus 20 (steps ST10 to ST15).

Furthermore, the service apparatus $S_2$ executes processes similar to those in steps ST4 to ST9 for the key pair of the service apparatus $S_2$, writes a private key $x_k$ in a private key storage unit $S_2 2$ of the service apparatus $S_2$, and transmits a public key $X_k$ to the cooperation apparatus 20, thereby registering the public key $X_k$ of the service apparatus $S_2$ in the public key storage unit 22 of the cooperation apparatus 20 (steps ST16 to ST21).

Then, the key generation processing is completed. After that, the respective apparatuses 10 to 30, $S_1$, and $S_2$ can acquire and use the public parameters and public keys made public to the public parameter storage unit 21 and public key storage unit 22 of the cooperation apparatus 20, as needed.

The ID issuing apparatus 30 executes (1-2) ID issuing processing, as shown in FIG. 3 and indicated by steps ST31 to ST35 below.

First, the ID issuing unit 32 of the ID issuing apparatus 30 issues an ID for identifying a user who uses each of the service apparatuses $S_1$ and $S_2$, and writes the issued ID in the ID issuance information storage unit 31 (step ST31).

The communication unit 33 distributes the ID stored in the ID issuance information storage unit 31 to the service apparatus $S_1$ (step ST32).

After that, upon receiving the ID distributed by the ID issuing apparatus 30, the communication unit $S_1 8$ of the service apparatus $S_1$ writes the ID in the user information storage unit $S_1 1$ in association with user information (step ST33).

Similarly, the communication unit 33 of the ID issuing apparatus 30 executes processing similar to that in step ST32 for the service apparatus $S_2$ (step ST34), and a communication unit $S_2 8$ of the service apparatus $S_2$ executes processing similar to that in step ST33 to write the ID in a user information storage unit $S_2 1$ in association with user information (step ST35).

Then, the ID issuing processing is completed.

Figure 4:
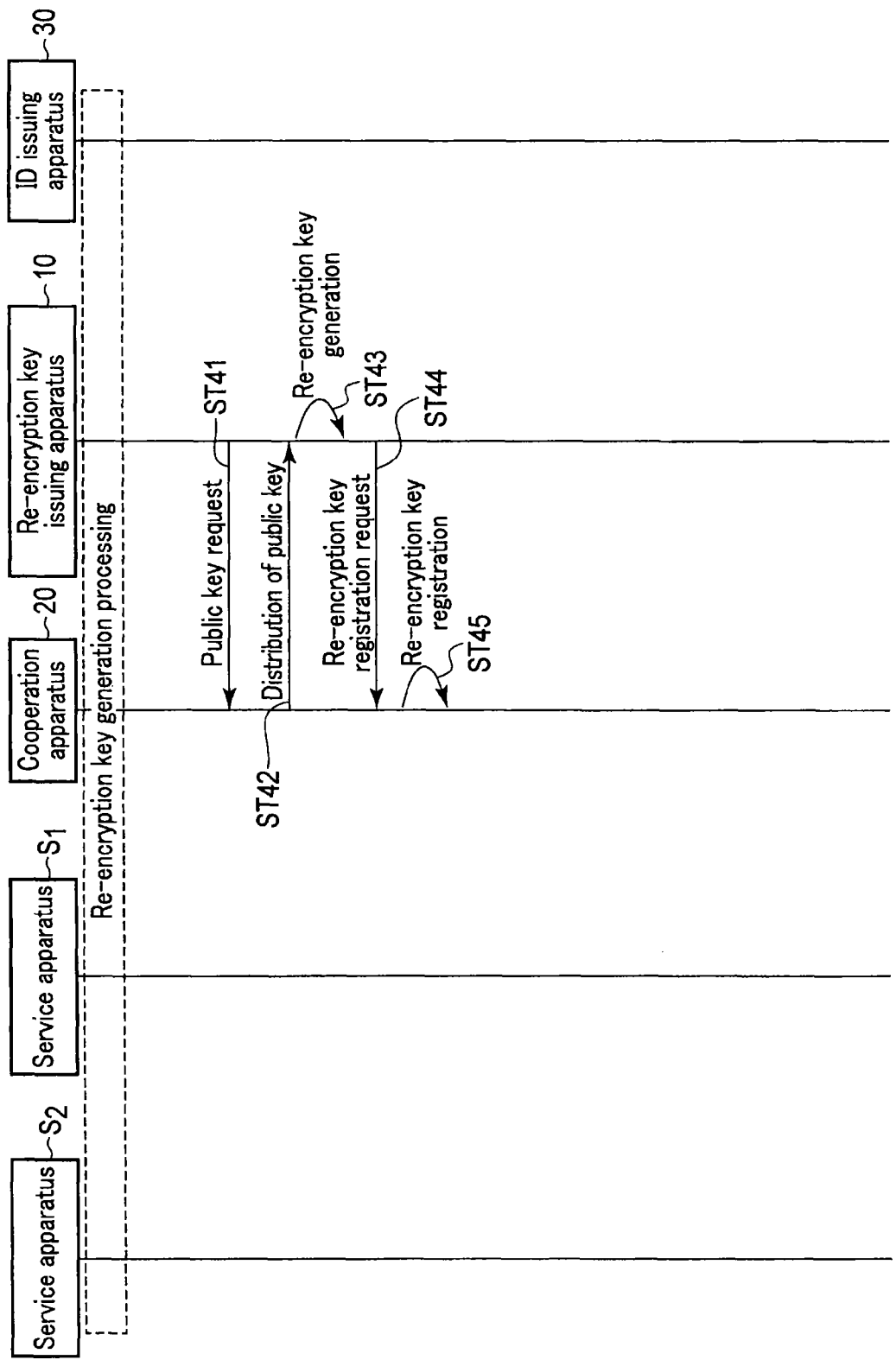
FIG. 4 is a sequence chart showing an example of re-encryption key generation processing according to the first embodiment.

The re-encryption key issuing apparatus 10 executes (1-3) re-encryption key generation processing, as shown in FIG. 4 and indicated by steps ST41 to ST45 below. Note that processing of generating a re-encryption key for converting ciphertext data for the re-encryption key issuing apparatus 10 into one for the service apparatus $S_2$ will be described.

First, the communication unit 16 of the re-encryption key issuing apparatus 10 requests the cooperation apparatus 20 to distribute the public parameters and the public key of the service apparatus $S_2$ (step ST41).

Upon receiving the request from the re-encryption key issuing apparatus 10 in step ST41, the communication unit 26 of the cooperation apparatus 20 transmits, to the re-encryption key issuing apparatus 10, the public parameters (p, λ, G, $G_T$, g, u, v, and Sig) stored in the public parameter storage unit 21 and the public key $X_k$ of the service apparatus $S_2$ stored in the public key storage unit 22 (step ST42).

Upon receiving, via the communication unit 16, the public parameters (p, λ, G, $G_T$, g, u, v, and Sig) and the public key $X_k$ of the service apparatus $S_2$, the encryption key/re-encryption key generation unit 15 of the re-encryption key issuing apparatus 10 generates a re-encryption key $R_{ik} = X_k^{1/x_i} = g^{x_k/x_i}$ for converting ciphertext data for the re-encryption key issuing apparatus 10 into one for the service apparatus $S_2$ by using the acquired information and the private key $x_i$ of the self apparatus 10 read out from the private key storage unit 12 (step ST43).

The communication unit 16 transmits the generated re-encryption key $R_{ik}$ to the cooperation apparatus 20 (step ST44).

After that, upon receiving the re-encryption key $R_{ik}$ transmitted by the re-encryption key issuing apparatus 10, the communication unit 26 of the cooperation apparatus 20 writes (registers) the re-encryption key in the re-encryption key storage unit 23 (step ST45).

Then, the re-encryption key generation processing is completed. Note that a re-encryption key for converting ciphertext data for the re-encryption key issuing apparatus 10 into one for the service apparatus $S_2$ is generated in this example. The present invention, however, is not limited to this, and a re-encryption key for converting ciphertext data for the re-encryption key issuing apparatus 10 into one for the service apparatus $S_1$ may be generated.

The cooperation apparatus 20 and the respective service apparatuses $S_1$ and $S_2$ execute (2) cooperation processing, as shown in FIG. 5 and indicated by steps ST51 to ST62 below.

First, in response to a request from the user, the communication unit $S_1 8$ of the service apparatus $S_1$ requests the cooperation apparatus 20 to distribute the public parameters and the public key of the re-encryption key issuing apparatus 10 (step ST51).

In response to the request from the service apparatus $S_1$ in step ST51, the communication unit 26 of the cooperation apparatus 20 transmits, to the service apparatus $S_1$, the public parameters (p, λ, G, $G_T$, g, u, v, and Sig) stored in the public parameter storage unit 21 and the public key $X_i$ of the re-encryption key issuing apparatus 10 stored in the public key storage unit 22 (step ST52).

Upon receiving the public parameters (p, λ, G, $G_T$, g, u, v, and Sig) and the public key $X_i$ via the communication unit $S_1 8$, the encryption processing unit $S_1 4$ of the service apparatus $S_1$ reads out the ID corresponding to the user in step ST51 from the user information storage unit $S_1 1$ (step ST53).

The encryption processing unit $S_1 4$ performs encryption processing for the ID read out from the user information storage unit $S_1 1$ using the public key $X_i$ of the re-encryption key issuing apparatus 10, thereby generating ciphertext data (step ST54).

As indicated by steps ST54-1 to ST54-4 below, the encryption processing performed by the encryption processing unit $S_1 4$ will be described in detail.

First, the encryption processing unit $S_1 4$ generates a key pair (ssk, svk)←$\hat{G}(\lambda)$ of a signature key ssk and a verification key svk in a one-time signature based on the security parameter $\lambda$ of the public parameters and the key pair generation function $\hat{G}$ (step ST54-1), and sets the verification key svk in first encrypted data $C_1$ ($C_1$=svk).

After generating a first random number r∈$Z_p^*$, the encryption processing unit $S_1 4$ generates second, third, and fourth encrypted data $C_2$, $C_3$, and $C_4$ for ID∈$G_T$ as plaintext data based on the first random number r (step ST54-2), given by:

$$C_2 = X_i^r$$

$$C_3 = e(g,g)^r \cdot ID$$

$$C_4 = (u^{svk} \cdot v)^r$$

More specifically, the encryption processing unit $S_1 4$ generates the second encrypted data $C_2$ based on the public key $X_i$ of the re-encryption key issuing apparatus 10 and the first random number r. The encryption processing unit $S_1 4$ generates the third encrypted data $C_3$ using the pairing function based on the generation source g of the public parameters, the first random number r, and the ID. Also, the encryption processing unit $S_1 4$ generates the fourth encrypted data $C_4$ based on the generation sources u and v of the public parameters, the generated verification key svk, and the first random number r.

After the end of step ST54-2, the encryption processing unit $S_1 4$ generates the one-time signature σ by the signature generation function S of the public parameters and the generated signature key ssk for the third and fourth encrypted data $C_3$ and $C_4$ (step ST54-3), given by:

$$\sigma = \hat{S}(ssk, (C_3, C_4))$$

After that, the encryption processing unit $S_1 4$ generates ciphertext data $C_i = (C_1, C_2, C_3, C_4, \sigma)$ including the first to fourth encrypted data $C_1$ to $C_4$ and the one-time signature σ, and writes the obtained ciphertext data in the temporary data storage unit $S_1 3$ (step ST54-4).

As described above, when the processes in steps ST54-1 to ST54-4 are complete, ciphertext data is generated.

After step ST54, the service cooperation request unit $S_1 7$ requests, via the communication unit $S_1 8$, the cooperation apparatus 20 to acquire information held in the service apparatus $S_2$ by using the ciphertext data generated by the encryption processing unit $S_1 4$ (step ST55).

Upon receiving the request and ciphertext data from the service apparatus $S_1$ via the communication unit 26 in step ST55, the re-encryption processing unit 25 of the cooperation apparatus 20 re-encrypts the ciphertext data using the re-encryption key $R_{ik}$ stored in advance in the re-encryption key storage unit 23 (step ST56).

As indicated by steps ST56-1 to ST56-3 below, the re-encryption processing performed by the re-encryption processing unit 25 will be described.

First, the re-encryption processing unit 25 verifies ciphertext data $C_{ki}$ using the public parameters and the following verification equations (step ST56-1):

$$e(C_2, u^{C_1} \cdot v) \stackrel{?}{=} e(X_i, C_4)$$

$$\hat{V}(C_1, \sigma, (C_3, C_4)) \stackrel{?}{=} 1$$

If the two verification equations hold, verification succeeds. On the other hand, if at least one of the verification equations does not hold, verification fails.

If verification succeeds, the re-encryption processing unit 25 generates a second random number t∈$Z_p^*$, and generates first, second, and third re-encrypted data $C_2'$, $C_2''$, $C_2'''$ (step ST56-2), given by:

$$C_2' = X_i^t$$

$$C_2'' = R_{ik}^{1/t} = g^{(x_k/x_i)^{t-1}}$$

$$C_2''' = C_2^t = X_i^{rt}$$

More specifically, in step ST56-2, the re-encryption processing unit 25 generates the first re-encrypted data $C_2'$ based on the public key $X_i$ of the re-encryption key issuing apparatus 10 and the second random number t. The re-encryption processing unit 25 generates the second re-encrypted data $C_2''$ based on the re-encryption key $R_{ik}$ and the second random number t. Furthermore, the re-encryption processing unit 25 generates the third re-encrypted data $C_2'''$ based on the second encrypted data $C_2$ and the second random number t.

After the end of step ST56-2, the re-encryption processing unit 25 generates re-encrypted data $C_k = (C_1, C_2', C_2'', C_2''', C_3, C_4, \sigma)$ by replacing the second encrypted data $C_2$ of the ciphertext data $C_i$ with the first to third re-encrypted data $C_2'$ to $C_2'''$, and writes the obtained re-encrypted data in the temporary data storage unit 24 (step ST56-3).

As described above, when the processes in steps ST56-1 to ST56-3 are complete, re-encrypted data is generated.

After step ST56, the communication unit 26 transmits the generated re-encrypted data $C_k$ to the service apparatus $S_2$ (step ST57), and requests to acquire information held in the service apparatus $S_2$ by using the re-encrypted data.

Upon receiving, via the communication unit $S_2 8$, the re-encrypted data $C_k$ transmitted by the cooperation apparatus 20, a decryption processing unit $S_2 5$ of the service apparatus $S_2$ decrypts the re-encrypted data using the private key $x_k$ stored in advance in the private key storage unit $S_2 2$, thereby acquiring the ID (step ST58).

As indicated by steps ST58-1 and ST58-2 below, the decryption processing performed by the decryption processing unit $S_2 5$ will be described in detail. First, the decryption processing unit $S_2 5$ verifies the re-encrypted data $C_k$ using the public parameters, the public key $X_k$ of the self apparatus $S_2$, and the following verification equations (step ST58-1):

$$e(C_2', C_2'') \stackrel{?}{=} e(X_k, g)$$

$$e(C_2''', u^{C_1} \cdot v) \stackrel{?}{=} e(C_2', C_4)$$

$$\hat{V}(C_1, \sigma, (C_3, C_4)) \stackrel{?}{=} 1$$

If the three verification equations hold, verification succeeds. On the other hand, if at least one of the three verification equations does not hold, verification fails.

If verification succeeds, the decryption processing unit $S_2 5$ decrypts the ID from the re-encrypted data $C_k$ based on the private key $x_k$ of the self apparatus $S_2$ (step ST58-2), given by:

$$ID = C_3 / (e(C_2'', C_2''')^{1/x_k})$$

As described above, when the processes in steps ST58-1 and ST58-2 are complete, the ID is acquired.

After step ST58, a service processing unit $S_26$ of the service apparatus $S_2$ reads out user information corresponding to the ID decrypted by the decryption processing unit $S_25$ from the user information storage unit $S_21$ (step ST59).

The communication unit $S_28$ transmits, as cooperation information, the user information read out by the service processing unit $S_26$ to the cooperation apparatus 20 (step ST60).

Upon receiving the cooperation information transmitted by the service apparatus $S_2$, the communication unit 26 of the cooperation apparatus 20 transmits the cooperation information to the service apparatus $S_1$ (step ST61).

After that, the communication unit $S_18$ of the service apparatus $S_1$ receives the cooperation information transmitted by the cooperation apparatus 20. Thus, the service apparatus $S_1$ acquires the cooperation information (step ST62).

According to the above-described first embodiment, the arrangement which includes the cooperation apparatus 20 including the re-encryption processing unit 25, the service apparatus $S_1$ including the encryption processing unit $S_14$, the decryption processing unit $S_15$, and the service cooperation request unit $S_17$, and the service apparatus $S_2$ including an encryption processing unit $S_24$, the decryption processing unit $S_25$, and a service cooperation request unit $S_27$ prevent the cooperation apparatus 20 from linking IDs with each other in a process of exchanging cooperation information between the service apparatuses $S_1$ and $S_2$, thereby improving the security for the cooperation information.

Also, it is possible to audit/verify later a process of exchanging cooperation information between the service apparatuses $S_1$ and $S_2$ by using the pieces of information held in the re-encryption key issuing apparatus 10 and cooperation apparatus 20 (that is, without requiring the pieces of secret information of the service apparatuses $S_1$ and $S_2$).

Note that in this embodiment, the ID stored in each of the user information storage units $S_11$ and $S_21$ of the service apparatuses $S_1$ and $S_2$ is encrypted using the re-encryption scheme. The present invention, however, is not limited to this. For example, hybrid encryption in which an ID is encrypted using a common encryption scheme and then the common key is encrypted using a re-encryption scheme may be applied.

[Modification]

A modification of the first embodiment will be explained with reference to sequence charts shown in FIGS. 6 and 7. In this modification, a code (a code before distribution corresponds to a first code in claim 2) generated from a user ID issued by the ID issuing apparatus 30 is distributed to each of the service apparatuses $S_1$ and $S_2$, and used to execute cooperation processing. Note that (1-1) key generation processing and (1-3) re-encryption key generation processing are the same as those in the aforementioned first embodiment and a detailed description thereof will be omitted.

A description of (1-2') code distribution processing and (2') cooperation processing different from the aforementioned first embodiment will be provided below.

Figure 6:
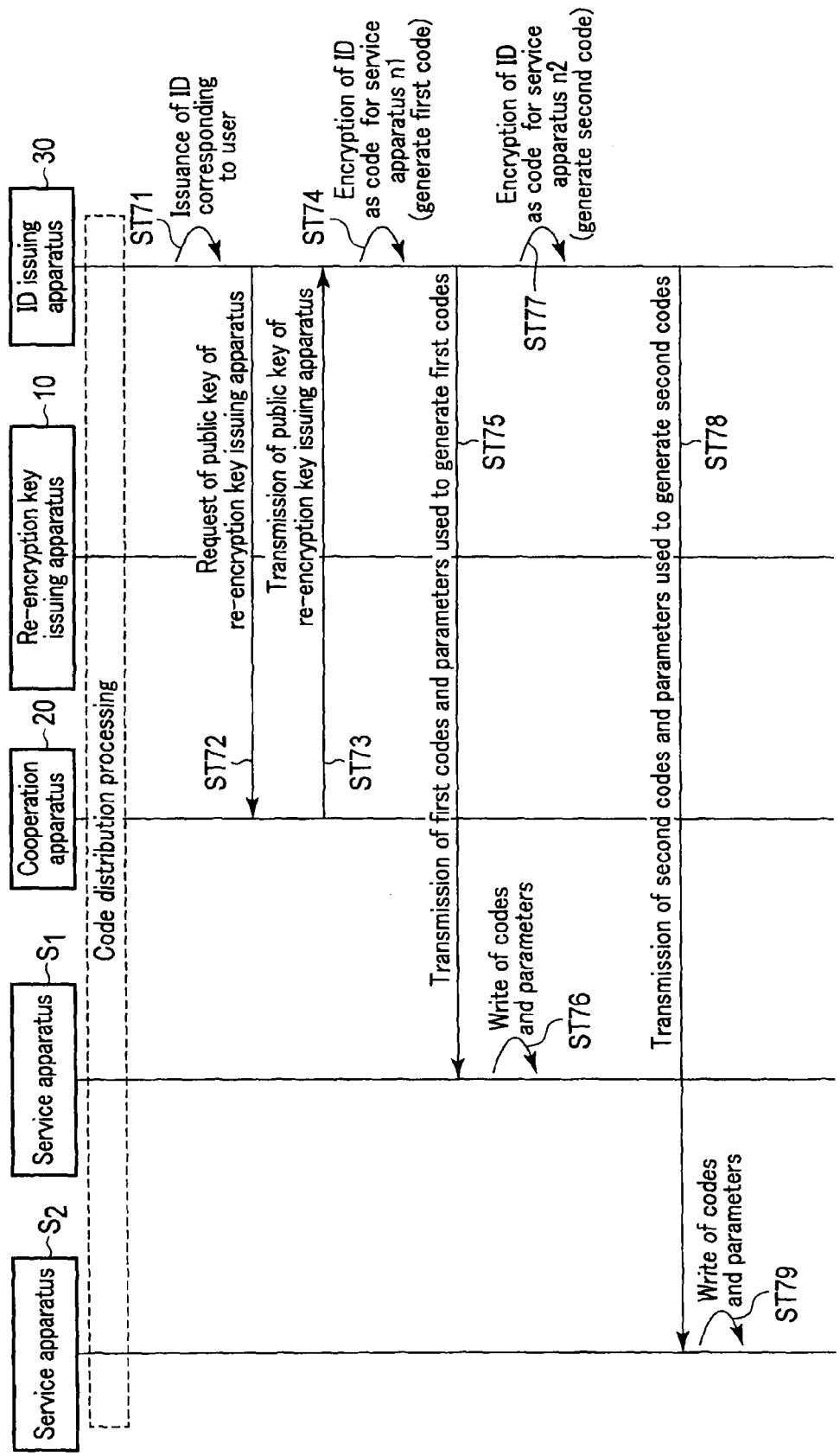
FIG. 6 is a sequence chart showing an example of code distribution processing according to a modification of the first embodiment.

The cooperation apparatus 20, the ID issuing apparatus 30, and the respective service apparatuses $S_1$ and $S_2$ execute (1-2') code distribution processing, as shown in FIG. 6 and indicated by steps ST71 to ST79 below.

First, the ID issuing unit 32 of the ID issuing apparatus 30 issues an ID for identifying a user who uses each of the service apparatuses $S_1$ and $S_2$, and writes the issued ID in the ID issuance information storage unit 31 (step ST71).

The communication unit 33 requests the cooperation apparatus 20 to distribute the public key of the re-encryption key issuing apparatus 10 (step ST72).

Upon receiving the request from the ID issuing apparatus 30 in step ST72, the communication unit 26 of the cooperation apparatus 20 transmits the public key $X_i$ of the re-encryption key issuing apparatus 10 stored in the public key storage unit 22 to the ID issuing apparatus 30 (step ST73).

Upon receiving, via the communication unit 33, the public key $X_i$ of the re-encryption key issuing apparatus 10 transmitted by the cooperation apparatus 20, the ID issuing unit 32 of the ID issuing apparatus 30 performs encryption processing for the ID stored in the ID issuance information storage unit 31 using the public key to generate the first code (the first code in claim 2) for the service apparatus $S_1$, and then writes the generated first code and various parameters (to be referred to as the first parameters hereinafter) used to generate the first code in the ID issuance information storage unit 31 (step ST74). Note that the processing in step ST74 is executed for all IDs stored in the ID issuance information storage unit 31.

The communication unit 33 transmits the plurality of first codes and the first parameters stored in the ID issuance information storage unit 31 to the service apparatus $S_1$ (step ST75).

After that, upon receiving the first codes and first parameters transmitted by the ID issuing apparatus 30, the communication unit $S_18$ of the service apparatus $S_1$ writes them in the user information storage unit $S_11$ in association with pieces of user information, respectively (step ST76).

Similarly, the ID issuing unit 32 of the ID issuing apparatus 30 executes processes similar to those in steps ST74 to ST76 for the second code (the first code in claim 2) for the service apparatus $S_2$. After generating the second codes, the second codes and various parameters (to be referred to as the second parameters hereinafter) used to generate the second codes are transmitted to the service apparatus $S_2$. After that, upon receiving the second codes and second parameters transmitted by the ID issuing apparatus 30, the communication unit $S_28$ of the service apparatus $S_2$ writes them in the user information storage unit $S_21$ in association with pieces of user information, respectively (steps ST77 to ST79).

Then, the code distribution processing is completed.

Figure 7:
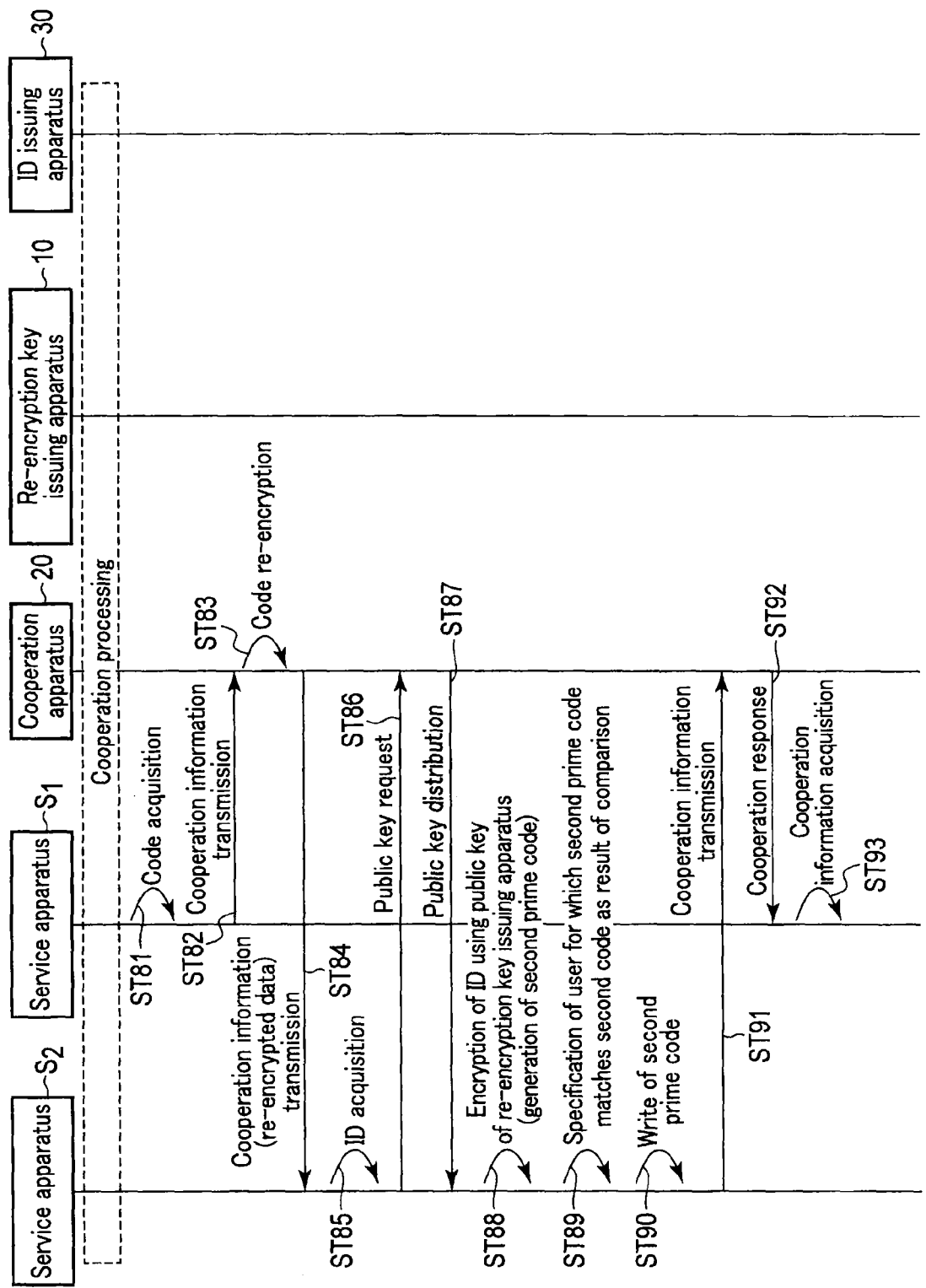
FIG. 7 is a sequence chart showing an example of cooperation processing according to the modification of the first embodiment.

The cooperation apparatus 20 and the respective service apparatuses $S_1$ and $S_2$ execute (2') cooperation processing, as shown in FIG. 7 and indicated by steps ST81 to ST93 below.

First, in response to a request from a user, the encryption processing unit $S_14$ of the service apparatus $S_1$ reads out the first code associated with the user information of the user from the user information storage unit $S_11$ (step ST81).

The service cooperation request unit $S_17$ requests, via the communication unit $S_18$, the cooperation apparatus 20 to acquire information held in the service apparatus $S_2$ by using the first code read out by the encryption processing unit $S_14$ (step ST82).

Upon receiving, via the communication unit 26, the request and first code from the service apparatus $S_1$ in step ST82, the re-encryption processing unit 25 of the cooperation apparatus 20 re-encrypts the first code using the re-encryption key $R_{ik}$ stored in advance in the re-encryption key storage unit 23 (that is, re-encrypted data is generated) (step ST83).

The communication unit 26 transmits the generated re-encrypted data to the service apparatus $S_2$ (step ST84), and requests to acquire information held in the service apparatus $S_2$ by using the re-encrypted data.

Upon receiving, via the communication unit $S_2 8$, the re-encrypted data transmitted by the cooperation apparatus 20, the decryption processing unit $S_2 5$ of the service apparatus $S_2$ decrypts the re-encrypted data using the private key $x_k$ stored in advance in the private key storage unit $S_2 2$, thereby acquiring an ID (step ST85).

The communication unit $S_2 8$ requests the cooperation apparatus 20 to distribute the public key of the re-encryption key issuing apparatus 10 (step ST86).

Upon receiving the request from the service apparatus $S_2$ in step ST86, the communication unit 26 of the cooperation apparatus 20 transmits the public key $X_i$ of the re-encryption key issuing apparatus 10 stored in the public key storage unit 22 to the service apparatus $S_2$ (step ST87).

Upon receiving, via the communication unit $S_2 8$, the public key $X_i$ of the re-encryption key issuing apparatus 10 transmitted by the cooperation apparatus 20, the encryption processing unit $S_2 4$ of the service apparatus $S_2$ performs encryption processing for the ID decrypted in step ST85 by using the public key and the second parameters stored in advance in the user information storage unit $S_2 1$, thereby generating a second prime code (the second code in claim 2) for the service apparatus $S_2$ (step ST88).

The service processing unit $S_2 6$ compares the generated second prime code with the second code stored in advance in the user information storage unit $S_2 1$ and read out from it, thereby specifying the user based on the matching codes (step ST89).

The service processing unit $S_2 6$ writes, in the user information storage unit $S_2 1$, the user information of the specified user and the second prime code generated by the encryption processing unit $S_2 4$ in association with each other (step ST90).

The communication unit $S_2 8$ transmits, as cooperation information, the user information stored in the user information storage unit $S_2 1$ by the service processing unit $S_2 6$ to the cooperation apparatus 20 (step ST91).

Upon receiving the cooperation information transmitted by the service apparatus $S_2$, the communication unit 26 of the cooperation apparatus 20 transmits the cooperation information to the service apparatus $S_1$ (step ST92).

After that, the communication unit $S_1 8$ of the service apparatus $S_1$ receives the cooperation information transmitted by the cooperation apparatus 20. Thus, the service apparatus $S_1$ acquires the cooperation information (step ST93).

According to the above-described modification of the first embodiment, similarly to the aforementioned first embodiment, the arrangement which includes the cooperation apparatus 20 including the re-encryption processing unit 25, and the plurality of service apparatuses $S_1$ and $S_2$ respectively including the encryption processing units $S_1 4$ and $S_2 4$, decryption processing units $S_1 5$ and $S_2 5$, and service cooperation request units $S_1 7$ and $S_2 7$ prevents the cooperation apparatus 20 from linking IDs with each other in a process of exchanging cooperation information between the service apparatuses $S_1$ and $S_2$, thereby improving the security for the cooperation information.

It is also possible to audit/verify later a process of exchanging cooperation information between the service apparatuses $S_1$ and $S_2$ by using the pieces of information held in the re-encryption key issuing apparatus 10 and cooperation apparatus 20 (that is, without requiring the pieces of secret information of the service apparatuses $S_1$ and $S_2$).

Figure 8:
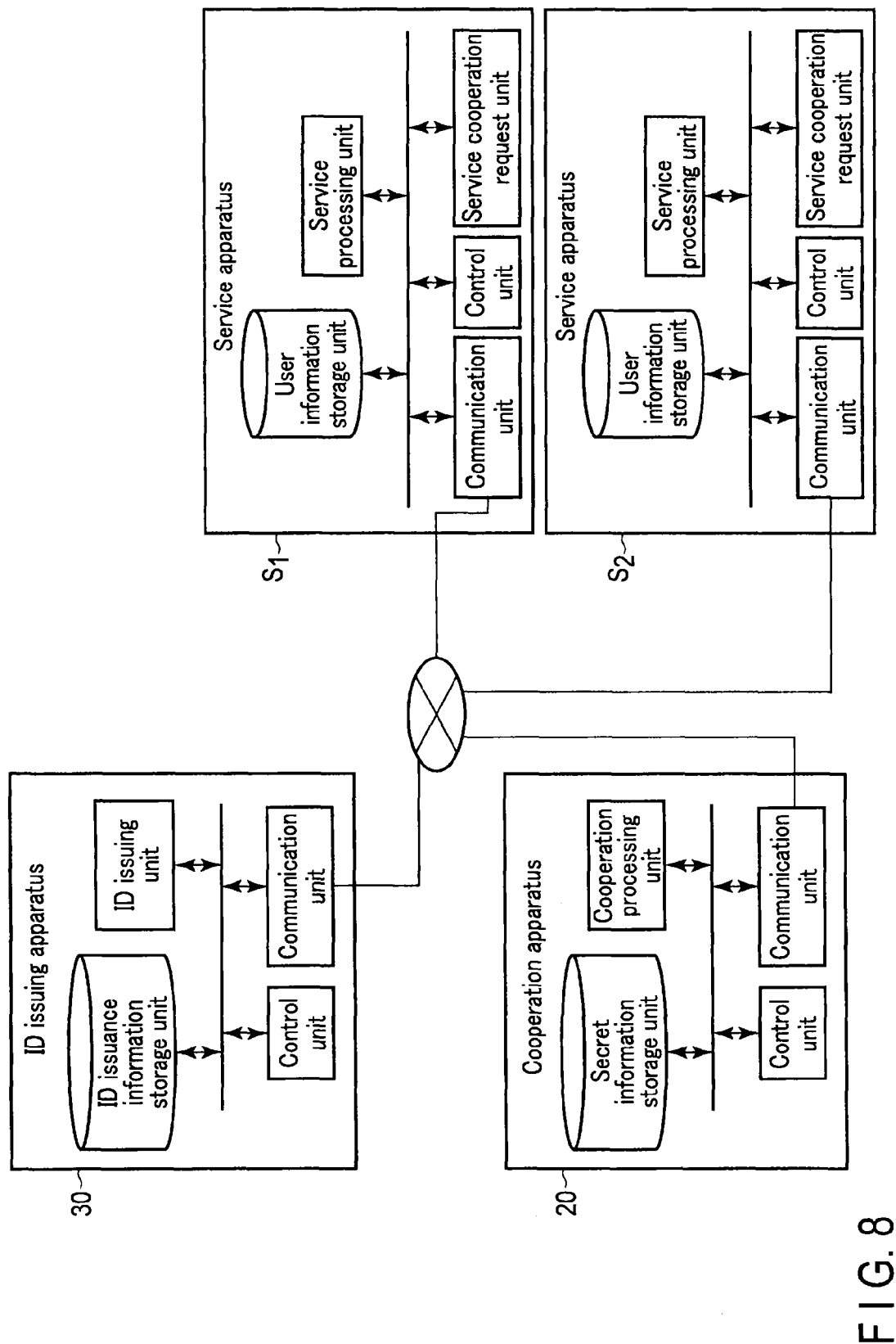
FIG. 8 is a schematic view showing an example of the arrangement of a cooperation service providing system according to another modification of the first embodiment.
Figure 9:
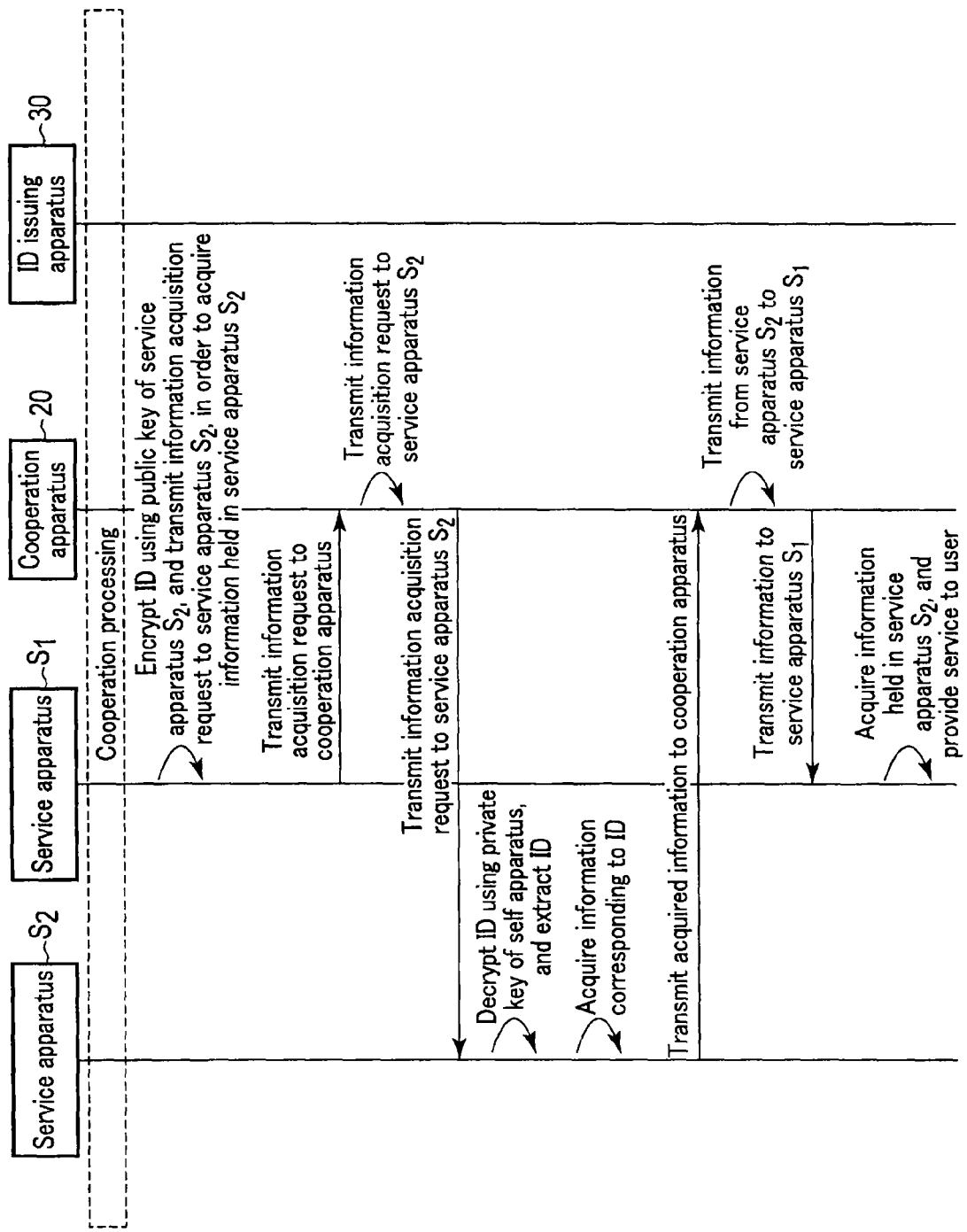
FIG. 9 is a sequence chart showing an example of cooperation processing according to the other modification of the first embodiment.

Note that as another modification of the first embodiment, a cooperation service providing system having an arrangement shown in FIG. 8 is applicable. This arrangement is obtained by simplifying the arrangement shown in FIG. 1 described above, and can operate, as shown in FIG. 9.

Simplifying the arrangement imposes an inconvenience to some extent when performing auditing on the cooperation apparatus 20 but can reduce the system cost required for implementing a cooperation service providing system.

Second Embodiment

Figure 10:
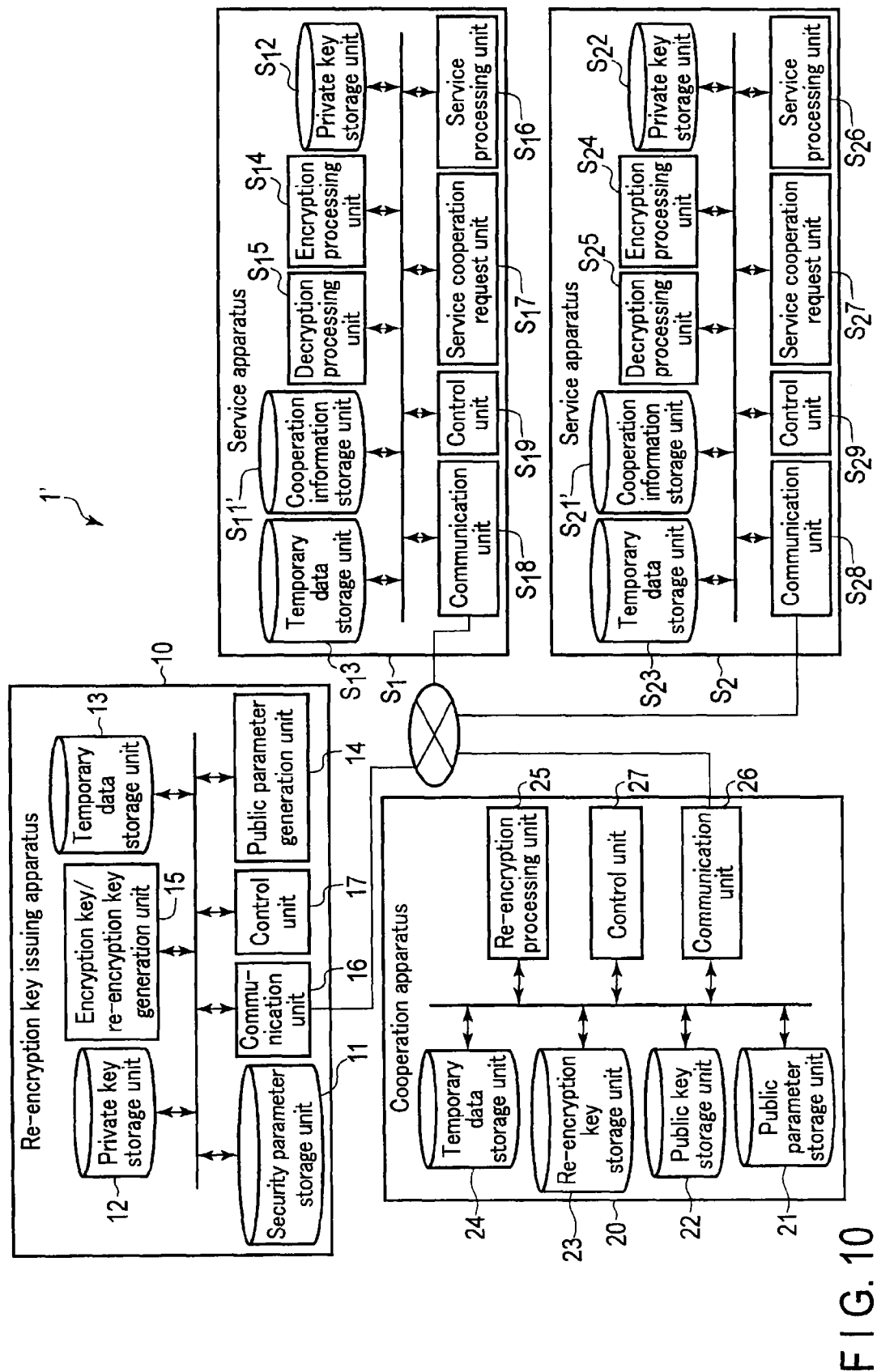
FIG. 10 is a schematic view showing an example of the arrangement of a cooperation service providing system according to the second embodiment.

FIG. 10 is a schematic view showing an example of the arrangement of a cooperation service providing system according to the second embodiment. Unlike the aforementioned first embodiment, a cooperation service providing system 1' has an arrangement obtained by excluding the ID issuing apparatus 30 from the cooperation service providing system 1. This embodiment is a modification of the aforementioned first embodiment. Assuming that a cooperation mechanism already exists between service apparatuses $S_1$ and $S_2$, data exchanged between the service apparatuses $S_1$ and $S_2$ are protected in cooperation processing. Unlike the user information storage units $S_1 1$ and $S_2 1$ in the aforementioned first embodiment, cooperation information storage units $S_1 1'$ and $S_2 1'$ of the service apparatuses $S_1$ and $S_2$ need only store cooperation information (corresponding to the user information in the first embodiment) in association with a user, and need not always store an ID for identifying the user.

A description of (2") cooperation processing different from the aforementioned first embodiment will be provided below.

Figure 11:
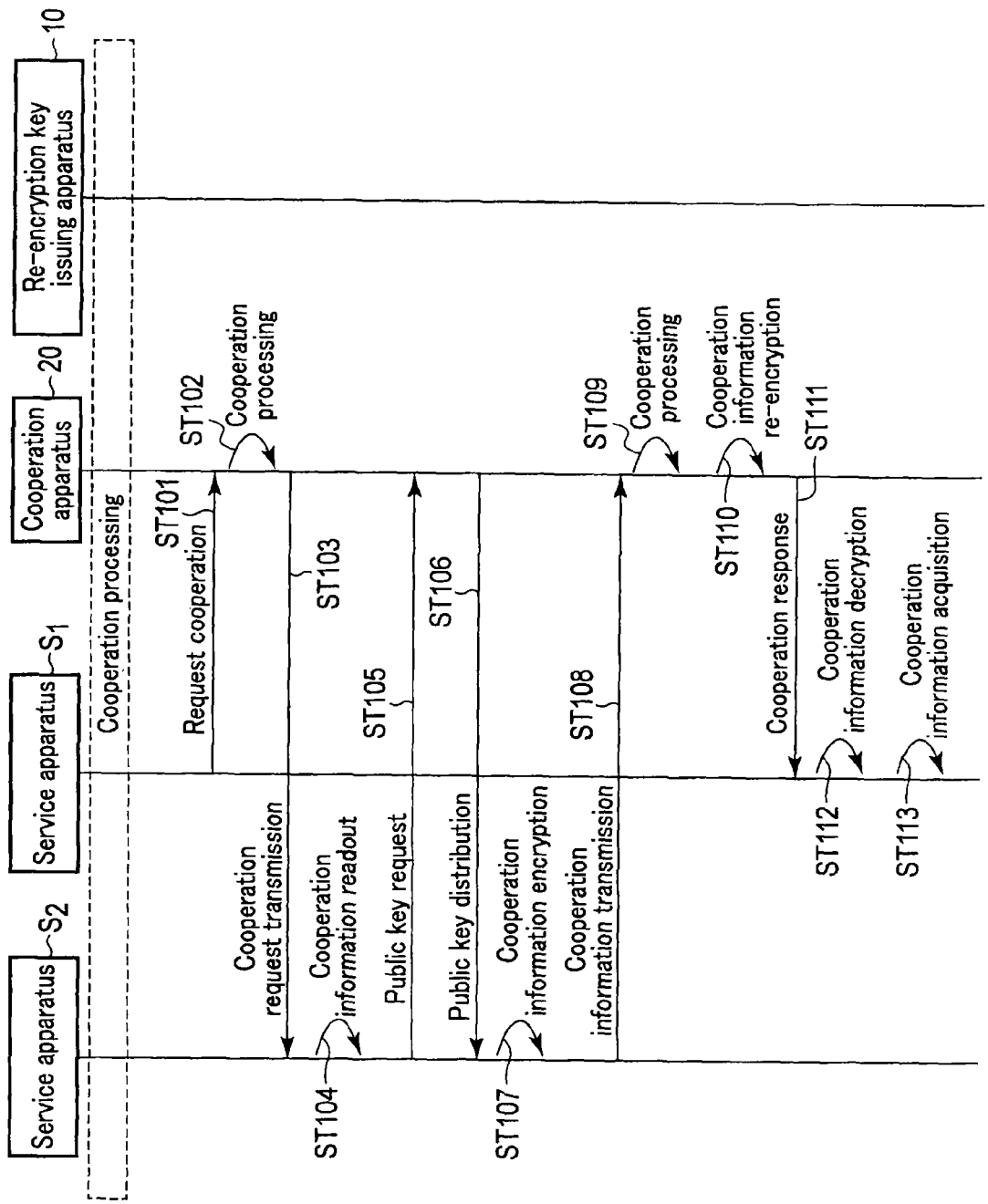
FIG. 11 is a sequence chart showing an example of cooperation processing according to the second embodiment.

A cooperation apparatus 20 and the service apparatuses $S_1$ and $S_2$ execute (2") cooperation processing, as shown in FIG. 11 and indicated by steps ST101 to ST113.

First, in response to a request from a user, a service cooperation request unit $S_1 7$ of the service apparatus $S_1$ requests, via a communication unit $S_1 8$, the cooperation apparatus 20 to acquire information held in the service apparatus $S_2$ (step ST101).

Upon receiving the request from the service apparatus $S_1$ in step ST101, a communication unit 26 of the cooperation apparatus 20 executes cooperation processing of causing the service apparatuses $S_1$ and $S_2$ to cooperate with each other by using, for example, a conventional method (step ST102).

The communication unit 26 transmits the request from the service apparatus $S_1$ in step ST102 to the service apparatus $S_2$ (step ST103).

Upon receiving the request of the service apparatus $S_1$ transmitted by the cooperation apparatus 20, a communication unit $S_2 8$ of the service apparatus $S_2$ reads out cooperation information corresponding to the user in step ST101 from the cooperation information storage unit $S_2 1'$ (step ST104).

The communication unit $S_2 8$ requests the cooperation apparatus 20 to distribute a public key of a re-encryption key issuing apparatus 10 (step ST105).

Upon receiving the request transmitted by the service apparatus $S_2$ in step ST105, the communication unit 26 of the cooperation apparatus 20 transmits a public key $X_i$ of the re-encryption key issuing apparatus 10 stored in a public key storage unit 22 to the service apparatus $S_2$ (step ST106).

Upon receiving, via the communication unit $S_2 8$, the public key $X_i$ of the re-encryption key issuing apparatus 10 transmitted by the cooperation apparatus 20, an encryption processing unit $S_2 4$ of the service apparatus $S_2$ performs encryption processing for the cooperation information read out in step ST104 by using the public key, thereby generating ciphertext data (step ST107).

The communication unit $S_2$8 transmits the generated ciphertext data to the cooperation apparatus 20 (step ST108).

Upon receiving the ciphertext data transmitted by the service apparatus $S_2$, the communication unit 26 of the cooperation apparatus 20 executes cooperation processing of causing the service apparatuses $S_1$ and $S_2$ to cooperate with each other, similarly to the processing in step ST102 (step ST109).

A re-encryption processing unit 25 performs re-encryption processing for the ciphertext data received by the communication unit 26 by using a re-encryption key $R_{ij}$ stored in advance in a re-encryption key storage unit 23, thereby generating re-encrypted data (step ST110).

The communication unit 26 transmits the re-encrypted data generated by the re-encryption processing unit 25 to the service apparatus $S_1$ (step ST111).

Upon receiving, via the communication unit $S_1$8, the re-encrypted data transmitted by the cooperation apparatus 20, the decryption processing unit $S_1$5 of the service apparatus $S_1$ decrypts the re-encrypted data using a private key $x_j$ stored in advance in a private key storage unit $S_1$2 (step ST112).

After that, the service apparatus $S_1$ acquires the cooperation information (step ST113).

According to the above-described second embodiment, the arrangement which includes the cooperation apparatus 20 including the re-encryption processing unit 25, the service apparatus $S_1$ including the cooperation information storage unit $S_1$1', an encryption processing unit $S_1$4, a decryption processing unit $S_1$5, and a service cooperation request unit $S_1$7, and the service apparatus $S_2$ including the cooperation information storage unit $S_2$1', the encryption processing unit $S_2$4, a decryption processing unit $S_2$5, and a service cooperation request unit $S_2$7 prevents the cooperation apparatus 20 from linking the pieces of cooperation information with each other in a process of exchanging cooperation information between the service apparatuses $S_1$ and $S_2$, and encrypts the pieces of cooperation information in the service apparatuses $S_1$ and $S_2$, thereby improving the security for the cooperation information.

It is also possible to audit later a process of exchanging cooperation information between the service apparatuses $S_1$ and $S_2$ by using the pieces of information held in the re-encryption key issuing apparatus 10 and cooperation apparatus 20 (that is, without requiring the pieces of secret information of the service apparatuses $S_1$ and $S_2$).

Note that in this embodiment, the pieces of cooperation information respectively stored in the cooperation information storage units $S_1$1' and $S_2$1' of the service apparatuses $S_1$ and $S_2$ are encrypted using the re-encryption scheme. The present invention, however, is not limited to this. For example, hybrid encryption in which cooperation information is encrypted using a common encryption scheme and then the common key is encrypted using a re-encryption scheme may be applied.

According to at least one of the above-described embodiments, the arrangement which includes the cooperation apparatus 20 including the re-encryption processing unit 25, and the plurality of service apparatuses $S_1$ and $S_2$ respectively including the encryption processing units $S_1$4 and $S_2$4, decryption processing units $S_1$5 and $S_2$5, and service cooperation request units $S_1$7 and $S_2$7 prevents the cooperation apparatus from linking pieces of cooperation information with each other, and allows auditing/verification to be performed alter on the cooperation apparatus.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A cooperation service providing system comprising:
a re-encryption key issuing apparatus;
a plurality of service apparatuses for providing various services to a user by using an identification (ID) issued for the user; and
a cooperation apparatus communicably connected to the plurality of service apparatuses and the re-encryption key issuing apparatus, wherein the cooperation apparatus comprises:
a first memory configured to store public keys of the re-encryption key issuing apparatus and the service apparatuses,
a second memory configured to store a re-encryption key for implementing re-encryption processing of enabling ciphertext data transmitted by a first service apparatus to be decrypted using a private key of a second service apparatus, first generation circuitry configured to generate, upon receiving the ciphertext data transmitted by the first service apparatus, re-encrypted data by performing re-encryption processing for the ciphertext data using the stored re-encryption key, first transmission circuitry configured to transmit the generated re-encrypted data to the second service apparatus, and second transmission circuitry configured to transmit the stored public keys to the service apparatuses, and the first service apparatus of the plurality of service apparatuses comprises:

a third memory configured to store the issued ID in association with user information unique to the service apparatus, a fourth memory configured to store a private key of the service apparatus, third transmission circuitry configured to transmit, to the cooperation apparatus, ciphertext data in which the ID of the user encrypted using a public key of the re-encryption key issuing apparatus stored in the first memory, and a request to acquire user information specified by the ID and stored in the second service apparatus, in response to an operation of the user, acquisition circuitry configured to acquire, upon receiving the re-encrypted data transmitted by the cooperation apparatus, the encrypted ID by decrypting the re-encrypted data using the stored private key, readout circuitry configured to read out the user information corresponding to the acquired ID from the third memory, and fourth transmission circuitry configured to transmit the readout user information to the second service apparatus via the cooperation apparatus.

2. A cooperation service providing system comprising:
a re-encryption key issuing apparatus:
a plurality of service apparatuses for providing various services to a user by using an identification (ID) issued for the user; and
a cooperation apparatus communicably connected to the plurality of service apparatuses, and the re-encryption key issuing apparatus, wherein
the cooperation apparatus comprises:
a first memory configured to store public keys of the re-encryption key issuing apparatus and the service apparatuses, a second memory configured to store a re-encryption key for implementing re-encryption processing of enabling ciphertext data transmitted by a first service apparatus to be decrypted using a private key of a second service apparatus, first generation circuitry configured to generate, upon receiving the ciphertext data transmitted by the first service apparatus, re-encrypted data by performing re-encryption processing for the ciphertext data using the stored re-encryption key, first transmission circuitry configured to transmit the generated re-encrypted data to the second service apparatus, and second transmission circuitry configured to transmit the stored public keys to the service apparatuses, and the first service apparatus of the plurality of service apparatuses comprises:

a third memory configured to store the issued ID linked with a first code unique to the service apparatus in association with user information unique to the service apparatus, a fourth memory configured to store a private key of the service apparatus, third transmission circuitry configured to transmit, to the cooperation apparatus, ciphertext data in which the ID of the user generated by using a public key of the re-encryption key issuing apparatus stored in the first memory and the first code linked with the ID are encrypted, and a request to acquire user information specified by the ID and stored in the second service apparatus, in response to an operation of the user, acquisition circuitry configured to acquire, upon receiving the re-encrypted data transmitted by the cooperation apparatus, the encrypted ID by decrypting the re-encrypted data using the stored private key, encryption circuitry configured to encrypt the decrypted ID to generate a second code, readout circuitry configured to read out the user information corresponding to the first code from the third memory, specifying circuitry configured to specify the user information by comparing the first code with the second code, and fourth transmission circuitry configured to transmit the readout user information to the second service apparatus via the cooperation apparatus.

3. A server apparatus of a cooperation service providing system, the cooperation service providing system including: a re-encryption key issuing apparatus, a plurality of service apparatuses for providing various services to a user by using an identification (ID) issued for the user, and a cooperation apparatus communicably connected to the plurality of service apparatuses a first service apparatus of the plurality of service apparatuses includes: a first memory which stores the issued ID in association with user information unique to the service apparatus, a second memory which stores a private key of the service apparatus, first generation circuitry which generates, in response to an operation of the user, ciphertext data by encrypting using a public key of the re-encryption key issuing apparatus received from the cooperation apparatus for the ID of the user, first transmission circuitry which transmits, to the cooperation apparatus, the generated ciphertext data and a request to acquire user information specified by the ID and stored in a second service apparatus, acquisition circuitry which acquires, upon receiving re-encrypted data transmitted by the cooperation apparatus, the encrypted ID by decrypting the re-encrypted data using the stored private key, readout circuitry which reads out the user information corresponding to the acquired ID from the first memory, and second transmission circuitry which transmits the readout user information to the second service apparatus via the cooperation apparatus, the server apparatus comprising:

a third memory configured to store public keys of the re-encryption key issuing apparatus and the service apparatuses;

a fourth memory configured to store a re-encryption key for implementing re-encryption processing of enabling ciphertext data transmitted by the first service apparatus to be decrypted using a private key of the second service apparatus;

second generation circuitry configured to generate, upon receiving the ciphertext data transmitted by the first service apparatus, re-encrypted data by performing re-encryption processing for the ciphertext data using the stored re-encryption key;

third transmission circuitry configured to transmit the generated re-encrypted data to the second service apparatus; and fourth transmission circuitry configured to transmit a stored public key of the stored public keys to the service apparatuses.

4. A cooperation service providing system comprising:
a re-encryption key issuing apparatus;
a plurality of service apparatuses for providing various services to a user; and
a cooperation apparatus communicably connected to the plurality of service apparatuses and the re-encryption key issuing apparatus,
wherein the cooperation apparatus comprises:
  a first memory configured to store public keys of the re-encryption key issuing apparatus and the service apparatuses,
  a second memory configured to store a re-encryption key for implementing re-encryption processing of enabling ciphertext data transmitted by a first service apparatus to be decrypted using a private key of a second service apparatus,
  first generation circuitry configured to generate, upon receiving the ciphertext data transmitted by the first service apparatus, re-encrypted data by performing re-encryption processing for the ciphertext data using the stored re-encryption key,
  first transmission circuitry configured to transmit the generated re-encrypted data to the other second service apparatus, and
  second transmission circuitry configured to transmit stored public keys to the service apparatuses, and
the first service apparatus of the plurality of service apparatuses comprises:
  a third memory configured to store cooperation information or between the service apparatuses in association with the user,
  a fourth memory configured to store a private key of the service apparatus,
  second generation circuitry configured to generate, in response to an operation of the user, ciphertext data by encrypting the cooperation information associated with the user by using a public key of the re-encryption key issuing apparatus transmitted by the cooperation apparatus,
  third transmission circuitry configured to transmit the generated ciphertext data to the cooperation apparatus, and
  acquisition circuitry configured to acquire, upon receiving the re-encrypted data transmitted by the cooperation apparatus, the encrypted cooperation information by decrypting the re-encrypted data using the private key.

5. A server apparatus of a cooperation service providing system, the cooperation service providing system including: a re-encryption key issuing apparatus, a plurality of service apparatuses for providing various services to a user, and a cooperation apparatus communicably connected to the plurality of service apparatuses, a first service apparatus of the plurality of service apparatuses includes: a first memory which stores cooperation information between the service apparatuses in association with the user, a second memory which stores a private key of the service apparatus, first generation circuitry which generates, in response to an operation of the user, ciphertext data by encrypting the cooperation information associated with the user by using a public key of the re-encryption key issuing apparatus transmitted by the cooperation apparatus, first transmission circuitry which transmits the generated ciphertext data to the cooperation apparatus, and acquisition circuitry which acquires, upon receiving re-encrypted data transmitted by the cooperation apparatus, the encrypted cooperation information by decrypting the re-encrypted data using the private key, the server apparatus comprising:
  a third memory configured to store public keys of the re-encryption key issuing apparatus and the service apparatuses;
  a fourth memory configured to store a re-encryption key for implementing re-encryption processing of enabling ciphertext data transmitted by the first service apparatus to be decrypted using a private key of a second service apparatus;
  second generation circuitry configured to generate, upon receiving the ciphertext data transmitted by the first service apparatus, re-encrypted data by performing re-encryption processing for the ciphertext data using the stored re-encryption key;
  third transmission circuitry configured to transmit the generated re-encrypted data to the second service apparatus; and
  fourth transmission circuitry configured to transmit the stored public keys to the service apparatuses.

* * * * *